(12) United States Patent
Ganapathi et al.

(10) Patent No.: US 11,799,738 B2
(45) Date of Patent: *Oct. 24, 2023

(54) COMMUNICATION OF A MESSAGE USING A NETWORK INTERFACE CONTROLLER ON A SUBNET

(71) Applicant: Intel Corporation, Santa Clara, CA (US)

(72) Inventors: Ravindra Babu Ganapathi, Hillsboro, OR (US); Andrew Friedley, Livermore, CA (US); Ravi Murty, Portland, OR (US); Vignesh Trichy Ravi, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/571,420

(22) Filed: Jan. 7, 2022

(65) Prior Publication Data
US 2022/0131768 A1  Apr. 28, 2022

Related U.S. Application Data

(63) Continuation of application No. 15/942,353, filed on Mar. 30, 2018, now abandoned.

(51) Int. Cl.
*H04L 41/00* (2022.01)
*H04L 69/16* (2022.01)
(Continued)

(52) U.S. Cl.
CPC .......... *H04L 41/24* (2013.01); *H04L 41/0806* (2013.01); *H04L 43/0811* (2013.01);
(Continued)

(58) Field of Classification Search
CPC . H04L 41/24; H04L 41/0806; H04L 43/0811; H04L 43/10; H04L 45/02;
(Continued)

(56) References Cited

U.S. PATENT DOCUMENTS 10,038,566 B1  7/2018  Olsen
10,917,334 B1  2/2021  Lamanna et al.
(Continued)

OTHER PUBLICATIONS

Chun et al., "Virtual Network Transport Protocols for Myrinet", Jan./Feb. 1998, IEEE Xplore, p. 53-63. (Year: 1998).*
(Continued)

*Primary Examiner* — Gil H. Lee
*Assistant Examiner* — Chhian (Amy) Ling
(74) *Attorney, Agent, or Firm* — Patent Capital Group

(57) ABSTRACT

A system, method, and apparatus may provide one or more tangible, nontransitory computer-readable storage media having stored thereon executable instructions to instruct a processor to: stripe an outgoing network message into two or more pieces; send a first piece to a receiver via a first network interface card (NIC), and a second piece to the receiver via a second NIC; and upon determining that the receiver failed to receive a piece of the outgoing network message, replay the piece that the receiver failed to receive via a third NIC.

25 Claims, 11 Drawing Sheets

(51) Int. Cl.
  *H04L 41/0806* (2022.01)
  *H04L 45/02* (2022.01)
  *H04L 43/0811* (2022.01)
  *H04L 43/10* (2022.01)
  *H04L 49/55* (2022.01)
  *H04L 47/125* (2022.01)
  *H04L 47/34* (2022.01)

(52) U.S. Cl.
  CPC .............. *H04L 43/10* (2013.01); *H04L 45/02* (2013.01); *H04L 47/125* (2013.01); *H04L 49/55* (2013.01); *H04L 69/16* (2013.01); *H04L 47/34* (2013.01)

(58) Field of Classification Search
  CPC ....... H04L 69/16; H04L 47/34; H04L 47/125; H04L 49/3009; H04L 49/55
  See application file for complete search history.

(56) References Cited

U.S. PATENT DOCUMENTS

| | | |
|---|---|---|
| 2003/0112805 A1 | 6/2003 | Stanton |
| 2005/0013255 A1 | 1/2005 | Knop et al. |
| 2006/0018263 A1* | 1/2006 | McGee .................. H04L 61/103 370/241 |
| 2006/0168274 A1* | 7/2006 | Aloni .................... H04L 69/169 709/230 |
| 2007/0098010 A1* | 5/2007 | Dube .................... G06F 9/5044 370/463 |
| 2008/0298267 A1 | 12/2008 | Knop et al. |
| 2010/0095064 A1 | 4/2010 | Aviles |
| 2011/0153840 A1 | 6/2011 | Narayana et al. |
| 2015/0067067 A1 | 3/2015 | Archer et al. |
| 2015/0163100 A1 | 6/2015 | Graf et al. |
| 2017/0054633 A1* | 2/2017 | Underwood .......... G06F 13/385 |
| 2017/0161090 A1 | 6/2017 | Kodama |
| 2018/0039518 A1 | 2/2018 | Jayaseelan et al. |
| 2019/0044875 A1 | 2/2019 | Murty et al. |
| 2019/0102236 A1 | 4/2019 | Sur et al. |
| 2019/0102568 A1 | 4/2019 | Hausauer et al. |

OTHER PUBLICATIONS

"Connect-IB Single/Dual-Port InfiniBand Host Channel Adapter Cards," Mellanox Connect-IB: http://www.mellanox.com/page/products_dyn?product_family=142&mtag=connect_ib, retrieved from the internet on Jul. 25, 2018, 2 pages.

"Fat-Trees and Dragonflies—A Perspective on Topologies", Reinemo, Sven-Arne, HPC Advisory Councile Switzerland Workshop, Simula Research, 20 pages.

"Introducing Aurora," Argonne Leadership Computing Facility, ALCF Staff, Apr. 9, 2015, retrieved from the internet on Jul. 25, 2018, https://www.alcf.anl.gov/articles/introducing-aurora, 3 pages.

"MVAPICH-Aptus: Scalable High-Performance Multi-Transport MPI over InfiniBand", Koop et al Network-Based Computing Lab, The Ohio State University, Lawrence Livermore National Lab, 34 pages.

"Scalable High Performance Message Passing over Infiniband for Open MPI", Friedley et al., Open Systems Laboratory, Sandia National Laboratories, Lawrence Livermore National Laboratory, 8 pages.

"Stampede Cutting-Edge HPC, Visualization, Data Analysis, and Data-lntensive Computing", Texas Advanced Computing Center, retrieved from the internet on Jul. 25, 2018, https://www.taxx.utexas.edu/systems/stampede, 2 pages.

"The Portals 4.0.2 Network Programming Interface", Barrett et al., Sandia Report, Sandia National Laboratories, Oct. 2014, 154 pages.

Barrett, et al., "A Low Impact Flow Control Implementation for Offload Communication Interfaces," EuroMPI 2012; LNCS 7490, pp. 27-36, Springer-Verlag Berlin Heidelberg (2012).

Kim et al., "Technology-Driven, High-Scalable Dragonfly Topology", IEE Computer Society; pp. 77-88 (2008).

Koop et al., "Designing High-Performance and Resilient Message Passign on InfiniBand", IEEE (2010) 7 pages.

Liu, J., et al., "Building Multirail Infiniband Clusters: MPI-Level Design and Performance Evaluation," IEEE (2004) 13 pages; https://pdfs.semanticscholar.org/e124/60cf8ae6150c118c54fb4434349afff45638.pdf.

Ju, J., et al., "Evaluating Infiniband Performance with PCI Express." IEEE Micro 25, No. 1 (2005): 20-29, 10 pages; http://citeseerx.ist.psu.edu/viewdoc/download?doi=10.1.1.229.561&rep=rep1&type=pdf.

Raikar, et al., "Designing Network Failover and Recovery in MPI for Multi-Rail InfiniBand Clusters," 2012 IEEE 26th International Parallel and Distributed Processing Symposium Workshops & PhD Forum, pp. 1160-1167.

Reference Implementation of Portals over Infiniband, retrieved from internet on Jul. 25, 2018, 2 pages; https://github.com/Portals4/portals4/tree/master/src/ib.

Understanding MPI Tag Matching and Rendezvous Offloads (ConnectX-5), created by ophirmaor on Aug. 31, 2016 2:05 PM; last modified by ophirmaor on Feb. 17, 2017 2:13 PM [retrieved and printed from the Internet on Mar. 21, 2018], © 2018 Mellanox Technologies, 4 pages; https://community.mellanox.com/docs/DOC-2583.

* cited by examiner

COMMUNICATION OF A MESSAGE USING A NETWORK INTERFACE CONTROLLER ON A SUBNET

CROSS-REFERENCE TO RELATED APPLICATIONS

This Application is a continuation (and claims benefit of priority under 35 U.S.C. § 120) of U.S. application Ser. No. 15/942,353, filed Mar. 30, 2018, entitled "COMMUNICATION OF A MESSAGE USING A NETWORK INTERFACE CONTROLLER ON A SUBNET." The disclosure of which is considered part of (and is incorporated by reference in) the disclosure of this application.

TECHNICAL FIELD

This disclosure relates in general to the field of computing and/or networking, and more particularly, to the communication of a message using a network interface controller on a subnet.

BACKGROUND

Emerging network trends in both data center and telecommunication networks place increasing performance demands on a system. Application performance depends on good use of the network and efficient use of the data traffic on the network. A network interface controller (NIC), also known as a network interface card, network adapter, LAN adapter, physical network interface, and other similar terms, is a computer hardware component that connects a computer to a network and provides applications with a dedicated, full-time connection to the network.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

The FIGURES of the drawings are not necessarily drawn to scale, as their dimensions can be varied considerably without departing from the scope of the present disclosure.

DETAILED DESCRIPTION

Example Embodiments

The following detailed description sets forth examples of apparatuses, methods, and systems relating to a system for enabling the communication of a message using a network interface controller (NICs) on a subnet. In an example, the communication may be of a large message using a NICs on a subnet The term "large message" refers to a message larger than a network maximum transmission unit (MTU). The MTU is the size of the largest network layer protocol data unit that can be communicated in a single network transaction. Features such as structure(s), function(s), and/or characteristic(s), for example, are described with reference to one embodiment as a matter of convenience; various embodiments may be implemented with any suitable one or more of the described features.

In the following description, various aspects of the illustrative implementations will be described using terms commonly employed by those skilled in the art to convey the substance of their work to others skilled in the art. However, it will be apparent to those skilled in the art that the embodiments disclosed herein may be practiced with only some of the described aspects. For purposes of explanation, specific numbers, materials and configurations are set forth in order to provide a thorough understanding of the illustrative implementations. However, it will be apparent to one skilled in the art that the embodiments disclosed herein may be practiced without the specific details. In other instances, well-known features are omitted or simplified in order not to obscure the illustrative implementations.

In the following detailed description, reference is made to the accompanying drawings that form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the following detailed description is not to be taken in a limiting sense. For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C).

Figure 1:
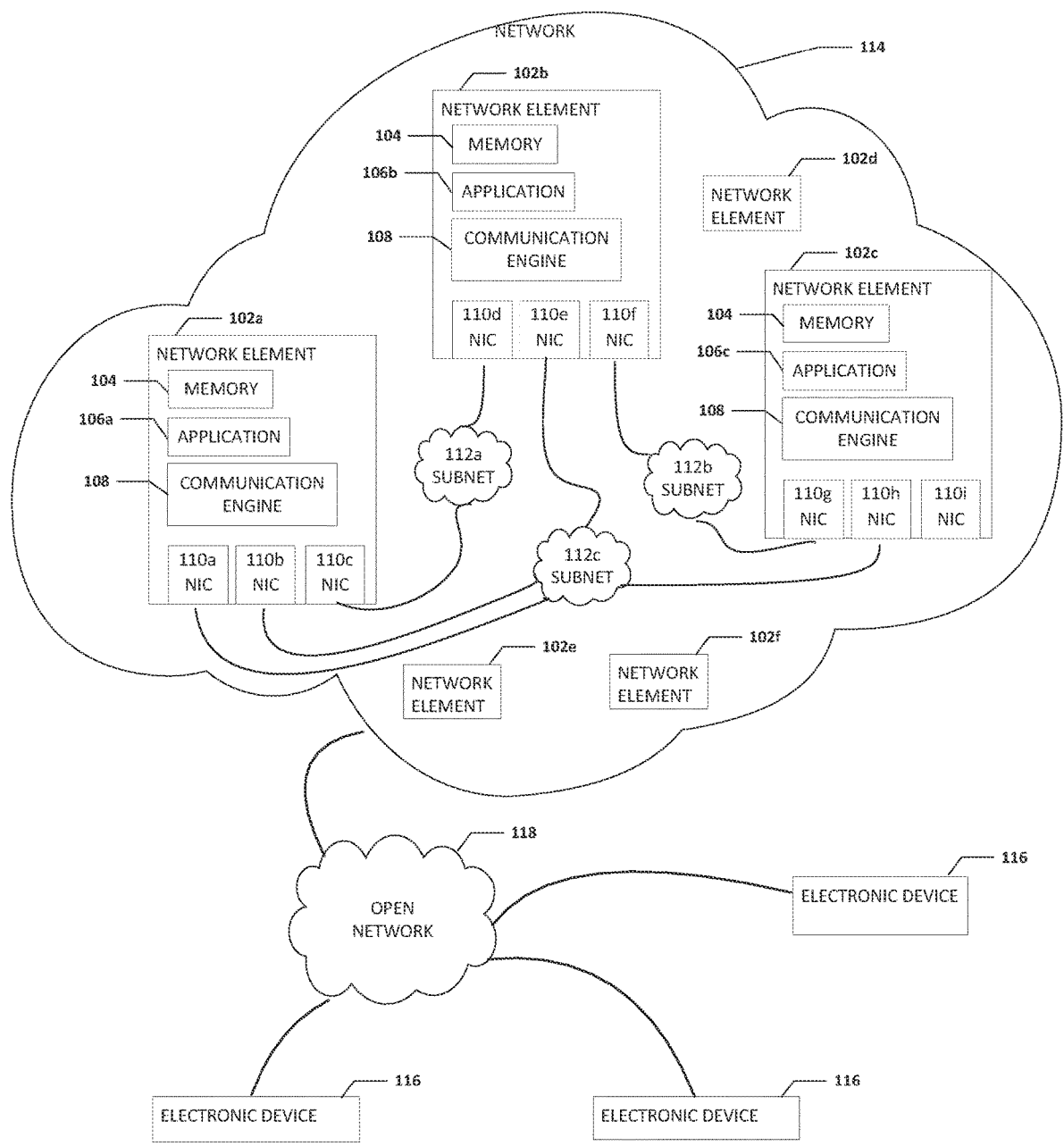
FIG. 1 is a simplified block diagram of a system to enable the communication of a message using a network interface controller (NICs) on a subnet, in accordance with an embodiment of the present disclosure.

FIG. 1 is a simplified block diagram of a system 100 to enable communication of a message using a NIC on a subnet, in accordance with an embodiment of the present disclosure. System 100 can include one or more network elements 102a-102f. Each of network elements 102a-102f can include memory, one or more applications, a communication engine, and two or more NICs. For example, network element 102a can include memory 104, an application 106a, a communication engine 108, and a plurality of NICs 110a-110c. Network element 102b can include memory 104, an application 106b, a communication engine 108, and a plurality of NICs 110d-110f. Network element 102c can include memory 104, an application 106c, a communication engine 108, and a plurality of NICs 110g-110i. Each application 106a-106c may be a virtual network function (VNF). Each NIC 110a-110h may be a high-speed NIC such as a high-speed host fabric interface (HFI).

Each of network elements 102a-102f, more specifically one or more NICs in each of network elements 102a-102f may be in communication with each other using a subnetwork (subnet). For example, NIC 110c in network element 102a and NIC 110d in network element 102b may be in communication using subnet 112a. NIC 110f in network element 102b and NIC 110g in network element 102c may be in communication using subnet 112b. NIC 110a and NIC 110b in network element 102a, NIC 110e in network element 102b, and NIC 110h in network element 102c may be in communication using subnet 112c. Network elements 102a-102c may also be in communication with each other using network 114. Each of subnets 112a-112c are a logical subdivision of network 114. In an example, network 114 may be part of a datacenter. In an example, one or more electronic devices 116 and open network 118 may be in communication with network 114. Each of NICs 110a-110i is configured to comply with a message passing interface protocol.

It is to be understood that other embodiments may be utilized and structural changes may be made without departing from the scope of the present disclosure. For example, each network element may have one or more applications, one or more regions of memory, and/or one or more NICs. Substantial flexibility is provided by system 100 in that any suitable arrangements and configuration may be provided without departing from the teachings of the present disclosure.

System 100 can be configured to enable a recovery scheme making the system resilient to NIC failures. In addition to system configurations consisting of dual planes, the system may even be used when two network elements are connected by multiple NICs possibly on different subnets as long as there are multiple NICs and paths through the network between two network elements. In an example, system 100 can be configured to include a subnet ID when communicating messages across network 114. The subnet ID (e.g., 8 bits) identifies the subnet that includes the NIC that communicated the message and allows the system to determine the communication path needed to communicate with NICs across the system. If a first NIC on a first network element is in a first subnet and fails, then the communications to the first NIC can be rerouted to a second NIC on the first network element in a second subnet. In an example, the system can be enabled to determine a NIC in a first subnet to be used to communicate a message using a first subnet, create a manifest that includes an identifier of the NIC and a subnet ID that identifies the first subnet, and communicate the manifest to the receiver. The term "receiver" includes the specific NIC that will receive the manifest. For example, if NIC 110a was to communicate the manifest to NIC 110e, then NIC 110e would be the receiver. The subnet ID can be added to a NIC table and the NIC table can include an identification of a plurality of NICs, a subnet associated with each of the plurality of NICs, and an identification of a specific network element that includes a specific NIC. The NIC table can also include an indicator when the specific NIC is active on a specific subnet that is associated with the specific NIC. When it is determined that one of the plurality of NICs in the first subnet to be used to communicate the message is a non-operating NIC and is not operational, the system can determine the network element that includes the non-operating NIC, determine an alternate NIC on a different subnet but on the same network element that includes the non-operating NIC and communicate with the alternate NIC using the different subnet. The communication with the alternate NIC can include a request to disable the non-operating NIC.

Elements of FIG. 1 may be coupled to one another through one or more interfaces employing any suitable connections (wired or wireless), which provide viable pathways for network (e.g., network 112, etc.) communications. Additionally, any one or more of these elements of FIG. 1 may be combined or removed from the architecture based on particular configuration needs. System 100 may include a configuration capable of transmission control protocol/Internet protocol (TCP/IP) communications for the transmission or reception of packets in a network. System 100 may also operate in conjunction with a user datagram protocol/IP (UDP/IP) or any other suitable protocol where appropriate and based on particular needs.

For purposes of illustrating certain example techniques of system 100, it is important to understand the communications that may be traversing the network environment. The following foundational information may be viewed as a basis from which the present disclosure may be properly explained.

Message passing interface (MPI) has become the de-facto programming model used in high performance computing (HPC). MPI provides both point-to-point as well as collective communications capabilities. The software stack for some NICs can provide a low-level communication application program interface (API) called the open fabric interface (OFI) that takes advantage of the off-load capabilities of hardware to implement efficient point-to-point and collective communications.

Tag match bits are part of the current MPI protocol. Rather than simply streaming data like TCP, MPI defines messages as a finite payload plus an envelope (which contains tag match bits). At the receiver, incoming messages are only delivered to memory regions that are associated with tag match bits found in the message's envelope. Messages communicated from one device to another device include tag match bits that the receiver can use to identify messages and determine where the message needs to be stored. In the current MPI protocol, multiple messages can have the same tag match bit value. If there are multiple messages from a single initiator and multiple receives at the receiver with the same tag match bits, the messages are matched in the order they are sent, per the MPI tag matching rule, even if the messages arrive out of order (e.g., due to different network paths or stale packets).

Recent trends in High Performance Computing (HPC) systems have demonstrated that a move to Peta and Exascale capable machines is possible not only because of improvements in the capabilities of the individual nodes or network element and the interconnects, but also an increase in the scale of the system size using a significantly large number of nodes. However, several challenges arise as the size of the system starts to grow. One challenge relates to efficiency as efficiency concerns demand low-overhead communication protocols that can be completely offloaded to hardware. While most modern RDMA capable devices, provide such offload, some devices support capabilities to enable efficient implementations of MPI and PGAS programming models. This includes support for efficient tag matching, collectives, and atomics that are expected to be used heavily by software and middleware components. Another challenge relates to application performance, a large part of which depends on the communication patterns of the applications that run on such systems and at least partially dictate the choice of topology. Topologies such as fat-trees provide good fault-tolerance through path-diversity, full bisection bandwidth for arbitrary permutations of communications and require simpler routing algorithms for deadlock free routing. However, they offer no adaptive routing features that allow the fabric to react to congestion in the network and choose alternative paths and can tolerate packets that arrive out-of-order as a result. Another challenge relates to cost and a big factor of cost is the cost of the infrastructure needed for such large systems (e.g. cost of expensive cables). Topologies such as Dragonfly which aim to improve overall performance, reduce system cost and provide features such as adaptive routing have become popular at the expense of more complicated routing requirements.

As systems get bigger their mean time between failure (MTBF) decreases significantly and such systems must be architected to ensure that they are resilient to failures. Some large systems use a Dragonfly topology and are built using "dual-plane" configurations where each node is connected to two identical but redundant fabric planes (subnets) via two separate NICs. While the Dragonfly topology offers enough redundancy in a single fabric plane (e.g., alternate routes between a pair of nodes in cases of link or switch failures), there are "weak links" in the system that lower the overall resiliency of the system. Two problematic weak links are the NIC itself and the link between the NIC and its neighboring switch in the group (the first level switch).

Some current systems address the need for fault-tolerant schemes to improve the overall resiliency of a large system. One system describes a light-weight protocol for message passing software that is able to recover from network failures such as switches and cables and end-node network devices themselves, however, such a protocol relies on the use of RC transport queue pairs (QPs) for reliability and error state/notification. The system also builds a higher level (MPI) protocol on top of what the IB HCA provides to work around some of the problems identified and also uses additional memory for buffering that limits scalability. In addition, given the increase in scale of HPC systems, recent advancements in MPI have shifted focus from RC QPs, which require per-peer connection state (memory foot print) that limits scalability and UD QPs offer a connection less model, but lack the reliability and error notification needed by the protocol. Another current system describes a scheme that provides resilience using multiple rails but is limited to MPI over IB. In addition, none of the current systems address the issue of stale packets.

A system for communication of a message using a network interface controller on a subnet, as outlined in FIG. 1, can resolve these issues (and others). MPI is the de-facto communication model for high-performance computing (HPC) and provides the ability to send and receive messages between processes and nodes. MPI provides both point-to-point as well as collective communications capabilities. The software stack for some NICs can provide a low-level communication application program interface (API) called the open fabric interface (OFI) that takes advantage of the off-load capabilities of hardware to implement efficient point-to-point and collective communications. System 100 can be configured to communicate a large message across multiple NICs and still maintain message/tag match ordering and not violate the MPI tag matching rule that is part of the MPI protocol. In system 100, each NIC is configured to comply with the MPI protocol The MPI tag matching rule is commonly understood as an ordering guarantee of certain properties of point-to-point semantics. The MPI tag matching rule is a non-overtaking rule that includes a requirement that facilitates the matching of sends to receives and guarantees that message-passing is deterministic. In cases where a single NIC and a single remote NIC are used to send and receive messages, tag matching for small and large messages can be relatively easily maintained because all messages are sent in order, initiated from a single NIC, and are destined to a single remote NIC.

When sending large messages, a GET command may be used. The GET command is part of the current MPI protocol. In a GET operation (e.g., an operation that uses the GET command), a receiver communicates a message to an initiator (in this example the initiator is commonly referred to as a target since it is the "target" of the GET command) requesting data from the initiator. The receiver can use the GET command to pull the data from the initiator's memory region that includes the data. One of the parameters of a GET command is an offset from which to start pulling data. For example, to pull a message with length "N" bytes, a first GET command can be issued with an offset of 0 and length N/2 and a second GET command can be issued with an offset of N/2 and a length of N/2. The offset is included in the header portion of the message that is part of the GET command. Another parameter included in the header portion of the message is the message identifier (ID). Also, in a PUT command from the initiator to the receiver, the message ID will be included in the header. The message ID is a unique value that distinguishes one message from all others.

Tag match bits are also part of the current MPI protocol. Rather than simply streaming data like TCP, MPI defines messages as a finite payload plus an envelope (which contains tag match bits). At the receiver, incoming messages are only delivered to memory regions that are associated with tag match bits found in the message's envelope. Messages communicated from one device to another device include tag match bits that the receiver can use to identify messages and determine where the message needs to be stored. In the current MPI protocol, multiple messages can have the same tag match bit value. If there are multiple messages from a single initiator and multiple receives at the receiver with the same tag match bits, the messages are matched in the order they are sent, per the MPI tag matching rule, even if the messages arrive out of order (e.g., due to different network paths). When the messages arrive and are matched out of order, errors can occur.

In an example, system 100 can be configured to send a relatively small message from an initiator on a chosen primary NIC that provides a receiver with a list of initiator NICs as well as transport protocol specific information. The primary NIC is a NIC that is used for all messages (independent of size) for a pair of MPI processes. The receiver can then use the list of initiator NICs as targets to communicate a plurality of GET commands and pull a large message from the initiator's memory when the receiver is ready to pull the large message. System 100 can be configured such that a GET command from the receiver to the initiator includes a message ID as the tag match bits. The message ID identifies the exposed region of memory on the initiator where the data for the large message is located. The receiver can communicate the message ID to the initiator so the initiator knows what data and region of memory is associated with the GET command. In addition, the receiver can choose a set of NICs on its node to initiate the GET commands.

In order to distinguish between an application initiated small message from the small message that includes the list of initiator NICs, the message that includes the list of initiator NICs utilizes an existing header data field but encodes the header data field with information that will allow the receiver to recognize that the initiator was trying to send a large message using multiple NICs. The envelope portion of the small message that includes the list of initiator NICs can include a message ID (to be used as tag match bits) for the message. The message ID can be used by the receiver to identify the exposed region of memory on the initiator where the data for the message is located. The initiator's response to the GET command will also include the message ID and the receiver can use the message ID to determine where to store each chunk of the large message as it arrives at the receiver in the receiver's exposed regions of memory and reconstruct the chunks of the large message.

The list of initiator NICs can be included in the payload portion of the message as a manifest. Once the initial small message that includes the manifest is delivered to the receiver from the initiator, the receiver can analyze the manifest and create a strategy to pull the full large message across the network using multiple GET commands. For example, the receiver can initiate a pull of the entire large message using one or more commands that will cause the communication of the large message to benefit from topologies that support other efficiencies such as adaptive routing. This allows the chunks of the large message to be delivered in any order and the manifest provides the receiver with enough information to pull the entire large message once the tag matching is successfully completed. The MPI tag matching rule is not violated because the initial small message includes the message ID (to be used as tag matching bits) necessary to ensure the chunks are sent to the correct memory region in the receiver and allow the chunks to be reconstructed into the original large message.

In MPI, a message consists of a data payload plus an envelope containing metadata. The envelope of each message can include a source, a tag, and a communicator. The source, tag, and communicator are used to match a send operation to a particular receive operation. Receive operations are posted to a pending receive queue where they await incoming messages. As each message arrives, its envelope is compared to each of the queued receives and the message is delivered (copied) into the memory area allocated by the first matching receive.

When presented with a message to send, the initiator first decides if it must employ a multi-unit message scheme (herein referred to as "MU"). If the message is smaller than the MTU, the message can be sent using a standard PUT command because the entire message fits in a single packet and can be delivered to the receiver with a single message. In a current standard PUT command (e.g., MPI PUT command), the header portion of the PUT command includes a message ID. The MTU is the size of the largest network layer protocol data unit that can be communicated in a single network transaction. Fixed MTU parameters usually appear in association with a communications interface or standard. If the message is above a threshold, the send is initiated by sending a relatively small amount of data (e.g., less than or equal to 64 bytes) in the payload portion of the message that describes a list of NICs that the initiator plans to use for the communication of the large message. The threshold can include messages that are above the MTU. In an example, an administrator may set the threshold as a message size that is larger the MTU based on system performance, bandwidth, overall cost, or other considerations. In some systems, if the message is larger than the network MTU, the message may be sent using a single NIC or across multiple NICs as messages that are slightly larger than the MTU may not benefit from MU.

The relatively small amount of data in the payload portion is called the manifest. The manifest can include a list of NICs on the initiator that the receiver can use to obtain the large message. The list of NICs may include all NICs on the initiator that can be employed to reach the destination on the receiver. In some cases, only a subset of the NICs available on the initiator might be part of this list. Note that the initiator might choose to prune the list of all the NICs that are available to reduce the overhead associated with exposing regions of memory to multiple NICs, reserve NICs for other traffic, and/or only provide NICs that are accessible from the receiver. The initiator can expose the allocated region of memory that includes the data for the large message to each NIC in the manifest that the initiator plans to use for communicating the large message. The receiver is free to choose from any of these NICs to pull any part or chunk of the large message.

In an illustrative example, the initiator can determine a plurality of local NICs that are able to communicate the large message and the address of each NIC. The initiator exposes the memory region that includes the data for the large message to the plurality of NICs, builds the manifest containing the addresses of all the plurality of NICs that will be used to communicate the large message to the receiver, inserts a message ID in an envelope portion of an MU message, and communicate the MU message that includes the manifest and message ID to the receiver instead of the large message. The header portion of the MU message includes a toggle flag or bit that indicates the initiator intends to use MU. The term "header data" includes header information (e.g., a source identifier, a destination identifier, type, etc.). If the MU bit is set, then the receiver knows that the message data is not application data but includes the manifest (the list of addressing information for the initiator's NICs). The receiver knows what NICs it has and, based on the manifest, the receiver knows what NICs the initiator has available for the receiver to request the large message using GET commands. The receiver can use GET commands to pull the large message from the memory region exposed to each NIC. For example, to pull a message with length "N" bytes in two chunks, one NIC will issue a GET command with an offset of 0 and length N/2 and the other NIC will issue a GET command with an offset of N/2 and also a length of N/2. The GET command to the initiator can also include a unique message ID in the envelope portion of the GET command. The message ID is a unique tag match value that the initiator associates with the memory region (that includes the data for the large message) that has been exposed to each NIC listed in the manifest. To generate the message ID, a simple counter can be read and incremented for each message or it can be derived from a hardware resource uniquely associated with the send operation (e.g., the NICs match entry handle for the exposed memory region). A key requirement is that the message ID is a unique value that distinguishes the large message from all other messages. When the receiver issues GET commands to pull message data, it uses the message ID (in the envelope portion of the MU message sent by the initiator) as the tag match bits to ensure the correct data is requested and received.

System 100 can be configured to utilize a fine-grained scheme where a single pair of MPI ranks can use multiple NICs (both on the source and destination) to transfer a single large message to a destination MPI rank. This can enable a software protocol on top of an RDMA capable device that offloads not only a transport protocol but can also handle tag matching and not violate the tag matching rule. In system 100, all messages, small and large are initiated from a primary NIC. This might seem limiting at first but the limitation may be eliminated, or mitigated, by observing that the MPI tag matching rule only applies to a pair of MPI endpoints. This means that the primary NIC used for tag matching may be different for different pairs of MPI processes (e.g., the MPI rank ID may be used as a hashing function to compute which of the local NICs should be used to send the initial message that includes the manifest and message ID).

In an example, when a receiver receives a message, the receiver examines the header data to see whether the message is an MU message and MU is in use. If the message sent by the initiator was not an MU message (e.g. the message was small or below the threshold) then the receiver accepts the message as a standard PUT command because the entire message fits in a single message packet and is delivered to the receiver. If the message is large (e.g., the message is larger than an MTU) but MU is not enabled, then the message may be broken up into chunks and each chunk can be sent using a RTS/CTS mechanism to transfer each chunk. This could also happen if the initiator is a legacy initiator that does not support MU. If the MU fields in the header data indicate that the initiator chose not to use MU, an expected receive operation is performed. If the header data is present and the MU indicator is set, indicating that the payload in the message includes the manifest, the receiver then tries to interpret the manifest to build a list of NICs to use to pull the large message from the initiator.

System 100 can be configured to benefit from the use of multiple NICs and paths to transfer a large message. In large systems where compute nodes are configured with resilient topologies such as Dragonfly and multiple subnets, such protocols increase the bandwidth of message transfer proportional to the number of NICs on each node. This is especially useful when each NIC is connected to a different subnet because the application is able to utilize both planes to transfer large messages. With some basic elements in the NIC hardware, fabric management, and a communication library (e.g., the runtime software) running on the node, the network may be extended to provide resiliency in the case of failures In an example with a first plane and a second plane, where a message (broken into packets) is sent between a pair of processes running on {group_0, switch_m−1, node_0} and {group_k, switch_0, node_1} respectively, if the first plane was being used (HFI 0 on each node) and there was a link or switch disruption in the first plane, the routing tables in the switches provide alternate routes to deliver the message to the destination, due to adaptive routing schemes (e.g., adaptive routing schemes are available in topologies such as DragonFly and other topologies). Even without disruptions in the fabric, adaptive routing can improve performance by using alternate non-minimal routes to the destination and work around congestion in the network. However, this assumes that packets of the message are able to ingress into the fabric meaning that the NIC that was used to send the message and the "local" link that connects the NIC port to the first level switch are still functional. If they are not still functional, then packets can be lost.

System 100 can be configured such that upon detection of a message failure (or part of a message failure), communication engine 108 can utilize the information included in the manifest to find alternate NICs and replay such messages. Since the use of RDMA that is offloaded to hardware allows incoming data to be placed directly in the final application buffer without kernel involvement, a key concern with replay of a message is that of stale packets that arrive much later. As an example, a message is replayed on a different NIC following a failure. After a message is marked complete (completion event) and ownership of the buffer associated with the NIC is handed off to the application, packets that were injected from the original NIC pair may still be in the network and can land on the buffer resulting in data corruption (e.g. if the application has used the data and repurposed the buffer for another message). The manifest can provide enough information for software to disable the appropriate entries in the NIC and protect against such cases.

In a simplified version of a network topology, switches in a subnet are connected to one or more network elements through NICs. Each switch is connected to every other switch in the subnet through a set of links (e.g., local group all-to-all). Links also connect the local switches to switches in other groups. In an example, a message (broken into packets) is sent between a pair of applications (e.g., application 106*a* and 106*b*). If a first subnet was being used and there was a link or switch disruption in the first subnet, the routing tables in the switches of the subnet would provide alternate routes to deliver the message to the destination, thanks to adaptive routing schemes available in topologies such as DragonFly. Even without disruptions in the subnet, adaptive routing can improve performance by using alternate non-minimal routes to the destination and work around congestion in the network. However, all of this assumes that packets of the message are able to ingress into the subnet meaning that the NIC they were sent on and the local link that connects the NIC to the first level switch are still functional.

System 100 can be configured to stripe a large message across multiple NICs in order to proportionally increase the bandwidth of the communication between two applications or processes. In the case of a dual-plane configuration, such a scheme utilizes both planes because each node is connected using two NICs that are in turn part of two separate but identical planes or subnets. However, there does not exist a mechanism or protocol to provide a reliably way to transfer a message in case of failures on one of the planes (e.g., a link or switch). The "weak links" described above are especially important given a failure of a NIC or a local link can cause an overall application failure unless software is able to failover messages (replay them) on the other functioning NIC.

In an example, system 100 can be configured to split large messages into segments that are sent across multiple NICs. In addition, to providing performance benefits by utilizing multiple NICs between a pair of nodes, the system can be configured to provide fault tolerance in cases of failures in the network. For example, with the right information, communication engine 108 can replay failed messages on other available resources. This of course assumes that the initial tag matching always happens consistently on a set of primary NICs between two peer nodes.

The broad requirements to build a resilient scheme consists of a hardware based error detection and reporting scheme. This can include a simple hardware based event delivery mechanism on the initiator and the target which indicate the success or failure along with a reason code. The broad requirements also include a well-defined interface between hardware and software (e.g. event queues and asynchronous error reporting) that allow software to configure, detect, and react to errors. The broad requirements also include use of multiple NICs to send and receive messages. In case of failures, messages that failed can be replayed on the functional NICs from the available list.

In an example, system 100 can be configured to maintain correctness for hardware offload NICs. More specifically, system 100 is applicable to hardware offload NICs such as those implementing the Portals protocol or a similar protocol. The Portals protocol is based on the concept of elementary building blocks that can be combined to support a wide variety of upper-level protocols and network transport semantics. In an example, system 100 can be configured to provide a generic scheme that uses some of the concepts of the Portals protocol and provide a API that is can allow scalable, relatively high-performance network communication between nodes of a parallel computing system and attempts to provide a cohesive set of building blocks with which a wide variety of upper layer protocols (such as MPI, Symmetric Hierarchical MEMory (SHMEM), or Unified Parallel C (UPC) may be built, while maintaining relatively high performance and scalability.

Upon detection of a failure (e.g. a message failed after several retries) hardware (e.g., NIC 110*a*) can report failures to a communication engine (e.g., communication engine 108) via an event queue like interface. Each event can provide a reason code as well as a reference to the message that failed. Such events allow the communication engine to decide when to replay messages on alternative resources. For example, if the reason code indicates that the message failed because the packets contained an invalid destination, there is no point retrying the message on a different NIC because it will result in the same outcome. However, if the reason code indicates that a hardware timeout resulted in the failure (e.g. an acknowledgement message (ACK) was not received from the target because of a remote NIC failure or link disruption), the communication engine can evaluate other possible options and potentially replay a failed message on a different NIC on the network element. It must be noted such a mechanism relies on the delivery of an event on the local NIC on which the original message is sent. In cases where the local NIC itself has failed, a mechanism can exist by which the communication engine is informed of a "fatal event" (e.g. communication to the communication engine) allowing the communication engine to replay all outstanding messages over other NICs in the network element (not knowing what parts of each message are complete).

The communication engine can handle potential stale packets in the network by performing a "flush" operation. In addition, communication engine can enumerate failed NICs in a NIC table and eliminate them from being advertised as an available resource. It must be noted that a NIC might be eliminated globally (for all targets) or to only specific targets depending on the failure. For instance, if the failure to send a message was due to a local (level 0) link failure, this impacts sending messages to any target and therefore is a global failure. However, if the failure to send a message to a target was due to a target side link failure, the NIC that was used can still be used to send messages to other targets.

In a specific example, a message (e.g., the reserved bits of the message) can be extended to include a subnet ID. The subnet ID (e.g., 8 bits) identifies the subnet that includes the NIC that communicated the message. A subnet consists of a set of ports where each port has one or more NICs such that all NICs in a given subnet are unique. In clusters that consists of multiple subnets, the fabric manager will configure each subnet with a separate subnet ID. This can also be applied to examples where each NIC has multiple ports and each port is assigned to a different subnet.

In an example, an initiator node "advertises" a list of NICs by which it exposes an application buffer. This list of NICs is used by the target when it issues GET requests. To ensure correctness, the target must build a list of NICs by performing a match of the subnet ID of each of its local NICs with the ones provided by the initiator. Once the pair of NICs have been identified, the target can issue GET requests over multiple pairs of NICs. Each request identifies a different offset into the initiator side buffer.

The target must wait for every message chunk to complete successfully before it can mark a message complete and hand it off to the application. In cases where one or more chunks fail, failure events delivered by the NIC must be examined to see if a message can be retried on a different NIC. To ensure correctness when another NIC is used, the target must compare subnet IDs to make sure it issues GET requests to the correct NICs on the initiator side.

In the case where response packets are delayed in the network (e.g. congestion or fabric failures), a failure is reported to the application as a result of a timeout. Since the NIC places incoming data directly in the destination buffer, it is possible for these delayed packets to arrive on a different NIC or subnet plane after the retried message is completed successfully and the buffer is handed off to the application. This leads to data corruption. To handle such scenarios, the target must disable the NIC that was used to issue the GET request. Once disabled, stale packets that arrive at the NIC are dropped and a disable message (e.g., a PTL_NI_PT-_DISABLED event) is sent back to the initiator of the packets to disable the NIC. Before re-enabling the NIC, the communication engine must perform a recovery operation where a global barrier is sent to all nodes in the job to ensure they stop sending packets. It must be noted that disabling the NIC and continuing with the other NICs in the network element can be done relatively quickly and does not need the recovery procedure to be completed or even started. Therefore, such a process allows the application to make further progress in the case of failures. If such a resiliency scheme is not implemented, the application must be aborted and restarted.

Turning to the infrastructure of FIG. 1, system 100 in accordance with an example embodiment is shown. Generally, system 100 may be implemented in any type or topology of networks. Network 114 represents a series of points or nodes of interconnected communication paths for receiving and transmitting packets of information that propagate through system 100. Network 114 offers a communicative interface between nodes, and may be configured as any local area network (LAN), virtual local area network (VLAN), wide area network (WAN), wireless local area network (WLAN), metropolitan area network (MAN), Intranet, Extranet, virtual private network (VPN), and any other appropriate architecture or system that facilitates communications in a network environment, or any suitable combination thereof, including wired and/or wireless communication.

In system 100, network traffic, which is inclusive of packets, frames, signals, data, etc., can be sent and received according to any suitable communication messaging protocols. Suitable communication messaging protocols can include a multi-layered scheme such as MPI, Open Systems Interconnection (OSI) model, or any derivations or variants thereof (e.g., Transmission Control Protocol/Internet Protocol (TCP/IP), user datagram protocol/IP (UDP/IP)). Messages through the network could be made in accordance with various network protocols, (e.g., Ethernet, MPI, Infiniband, OmniPath, etc.). Additionally, radio signal communications over a cellular network may also be provided in system 100. Suitable interfaces and infrastructure may be provided to enable communication with the cellular network.

The term "packet" as used herein, refers to a unit of data that can be routed between a source node and a destination node on a packet switched network. A packet includes a source network address and a destination network address. These network addresses can be Internet Protocol (IP) addresses in a TCP/IP messaging protocol. The term "data" as used herein, refers to any type of binary, numeric, voice, video, textual, or script data, or any type of source or object code, or any other suitable information in any appropriate format that may be communicated from one point to another in electronic devices and/or networks. Additionally, messages, requests, responses, and queries are forms of network traffic, and therefore, may comprise packets, frames, signals, data, etc.

In an example implementation, network elements 102a-102f, are meant to encompass network elements, network appliances, servers, routers, switches, gateways, bridges, load balancers, processors, modules, or any other suitable device, component, element, or object operable to exchange information in a network environment. Network elements 102a-102f may include any suitable hardware, software, components, modules, or objects that facilitate the operations thereof, as well as suitable interfaces for receiving, transmitting, and/or otherwise communicating data or information in a network environment. This may be inclusive of appropriate algorithms and communication protocols that allow for the effective exchange of data or information. Each of network elements 102a-102f may be virtual or include virtual elements.

In regard to the internal structure associated with system 100, each of network elements 102a-102f can include memory elements for storing information to be used in the operations outlined herein. Each of network elements 102a-102f may keep information in any suitable memory element (e.g., random access memory (RAM), read-only memory (ROM), erasable programmable ROM (EPROM), electrically erasable programmable ROM (EEPROM), application specific integrated circuit (ASIC), etc.), software, hardware, firmware, or in any other suitable component, device, element, or object where appropriate and based on particular needs. Any of the memory items discussed herein should be construed as being encompassed within the broad term 'memory element.' Moreover, the information being used, tracked, sent, or received in system 100 could be provided in any database, register, queue, table, cache, control list, or other storage structure, all of which can be referenced at any suitable timeframe. Any such storage options may also be included within the broad term 'memory element' as used herein.

In certain example implementations, the functions outlined herein may be implemented by logic encoded in one or more tangible media (e.g., embedded logic provided in an ASIC, digital signal processor (DSP) instructions, software (potentially inclusive of object code and source code) to be executed by a processor, or other similar machine, etc.), which may be inclusive of non-transitory computer-readable media. In some of these instances, memory elements can store data used for the operations described herein. This includes the memory elements being able to store software, logic, code, or processor instructions that are executed to carry out the activities described herein.

In an example implementation, elements of system 100, such as network elements 102a-102f may include software modules (e.g., communication engine 108) to achieve, or to foster, operations as outlined herein. These modules may be suitably combined in any appropriate manner, which may be based on particular configuration and/or provisioning needs. In example embodiments, such operations may be carried out by hardware, implemented externally to these elements, or included in some other network device to achieve the intended functionality. Furthermore, the modules can be implemented as software, hardware, firmware, or any suitable combination thereof. These elements may also include software (or reciprocating software) that can coordinate with other network elements in order to achieve the operations, as outlined herein.

Additionally, each of network elements 102a-102f may include a processor that can execute software or an algorithm to perform activities as discussed herein. A processor can execute any type of instructions associated with the data to achieve the operations detailed herein. In one example, the processors could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read-only memory (EPROM), EEPROM) or an ASIC that includes digital logic, software, code, electronic instructions, or any suitable combination thereof. Any of the potential processing elements, modules, and machines described herein should be construed as being encompassed within the broad term 'processor.'

Figure 2A:
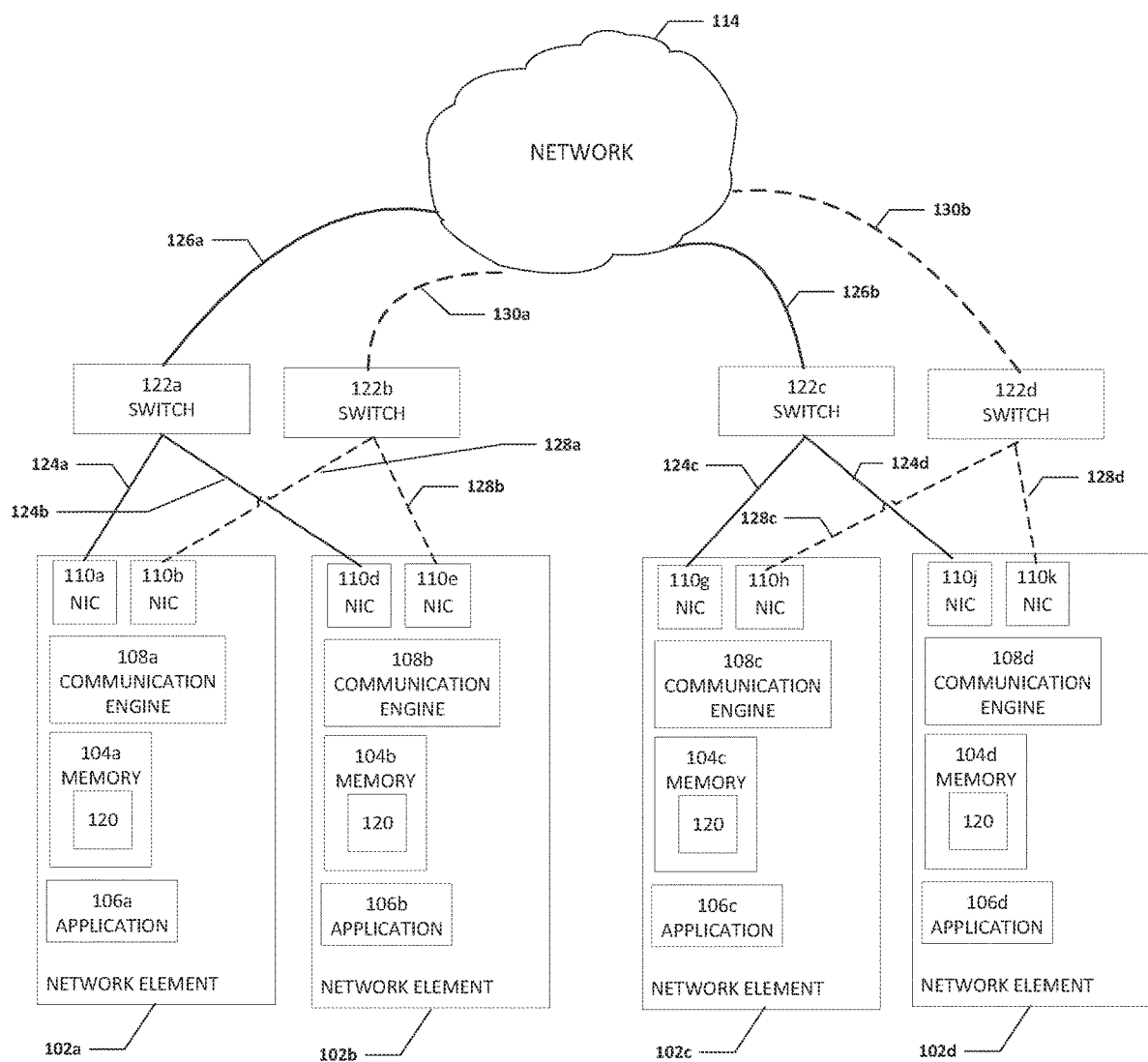
FIG. 2A-2C are a simplified block diagrams of a portion of a system to enable the communication of a message using a NIC on a subnet, in accordance with an embodiment of the present disclosure.

Turning to FIG. 2A, FIG. 2A is a simplified block diagram of an example of communications in system 100. In an example, network element 102a can include memory 104, application 106a, communication engine 108, and NICs 110a and 110b. Memory 104a can include NIC table 120. Network element 102b can include memory 104, application 106b, communication engine 108, and NICs 110d and 110e. Memory 104b can include NIC table 120. Network element 102c can include memory 104, application 106c, communication engine 108, and NICs 110g and 110h. Memory 104c can include NIC table 120. Network element 102d can include memory 104, application 106d, communication engine 108, and NICs 110j and 110k. Memory 104d can include NIC table 120.

NIC 110a in network element 102a can be in communication with first level switch 122a using first level subnet path 124a and NIC 110d in network element 102b can be in communication with first level switch 122a using first level subnet subnet path 124b. First level switch 122a can be in communication with network 114 using first subnet path 126a. In addition, NIC 110g in network element 102c can be in communication with first level switch 122c using first level subnet path 124c and NIC 110j in network element 102d can be in communication with first level switch 122c using first level subnet path 124d. First level switch 122c can be in communication with network 114 using first subnet path 126b. NICs 110a, 110d, 110g, and 110j and first level switches 122a and 122c are on the same first subnet.

NIC 110b in network element 102a can be in communication with first level switch 122b using first level subnet path 128a and NIC 110e in network element 102b can be in communication with first level switch 122b using first level subnet subnet path 128b. First level switch 122b can be in communication with network 114 using second subnet path 130a. In addition, NIC 110h in network element 102c can be in communication with first level switch 122d using first level subnet path 128c and NIC 110k in network element 102d can be in communication with first level switch 122d using first level subnet path 128d. First level switch 122d can be in communication with network 114 using second subnet path 130b. NICs 110b, 110e, 110h, and 110k and first level switches 122b and 122d are on the same second subnet.

In an example, application 106a can communicate with application 106c using NIC 110a and NIC 110g. In one direction, the communication would travel from NIC 110a to first level switch 122a on first level subnet path 124a, from first level switch 122a to network 114 on first subnet path 126a, from network 114 to first level switch 122c on first subnet path 126b, and from first level switch 122c to NIC 110g on first level subnet path 124c. In the opposite direction, the communication would travel from NIC 110g to first level switch 122c on first level subnet path 124c, from first level switch 122c to network 114 on first subnet path 126b, from network 114 to first level switch 122a on first subnet path 126a, and from first level switch 122a to NIC 110a on first level subnet path 124a. Issues with the communication path from first level switch 122a, through network 114, to first level switch 122c are left for the network architecture to handle. However, the network architecture cannot handle issues from network element 102a to first level switch 122a or from network element 102c to first level switch 122c.

Figure 2B:
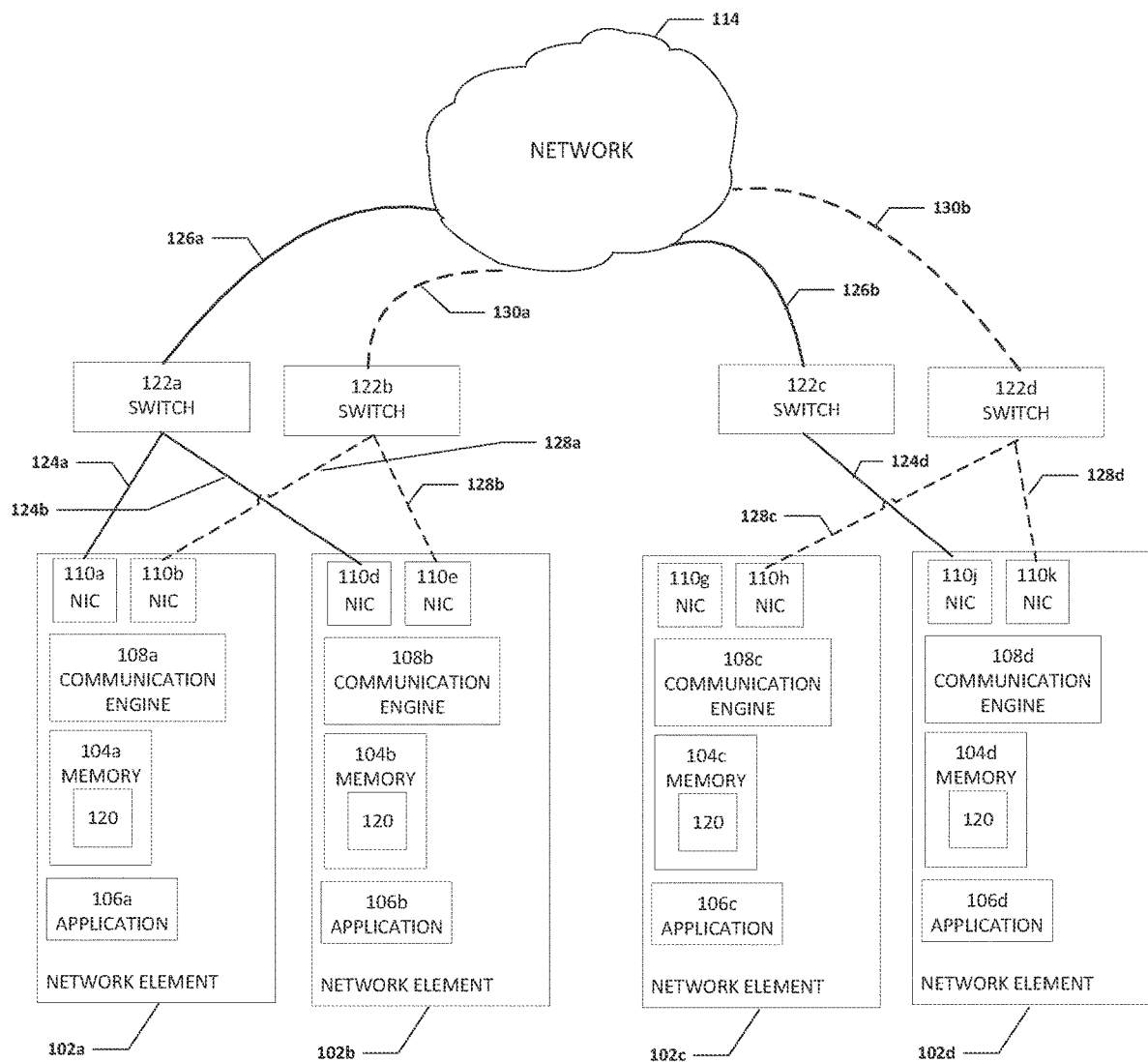

Turning to FIG. 2B, FIG. 2B is a simplified block diagram of an example of communications in system 100. As illustrated in FIG. 2B, first level subnet path 124c has been compromised and is preventing communication between NIC 110g and first level switch 122c. As a result, network element 102c and application 106c can no longer communicate with network element 102a and application 106a on the first subnet associated with first level subnet path 124c.

In an example, communication engine 108a can receive a failure notification from NIC 110a that communications with NIC 110g have failed. Communication engine 108a can analyze NIC table 120 and determine that NIC 110g is located on network element 102c and that local NIC 110b is in communication with NIC 110h which is also located on network element 102c. Communication engine 108a can send an out of band message to communication engine 108c using NIC 110b, first level subnet path 128a, first level switch 122b, second subnet path 130a, network 114, second subnet path 130b, first level switch 122d, first level subnet path 128c, and NIC 110h.

Communication engine 108c can receive the out of band message and disable NIC 110g. Also, communication engine 108c can resend any data that was not delivered or for which an acknowledgement was not received. In addition, communication engine 108c can change the entry for NIC 110g in NIC table 120 to indicate that NIC 110g is disabled. The updated NIC table 120 can be communicated to the network elements in system 100.

In another example, communication engine 108c can receive a failure notification from NIC 110g that communications with NIC 110a have failed. Communication engine 108c can analyze NIC table 120 and determine that NIC 110a is located on network element 102a and that local NIC 110h is in communication with NIC 110b which is also located on network element 102a. Communication engine 108c can send an out of band message to communication engine 108a using NIC 110h, first level subnet path 128c, first level switch 122d, second subnet path 130b, network 114, second subnet path 130a, first level switch 122b, first level subnet path 128a, and NIC 110b.

Communication engine 108a can receive the out of band message and disable NIC 110a. In addition, communication engine 108a can change the entry for NIC 110g in NIC table 120 to indicate that NIC 110g is disabled. The updated NIC table 120 can be communicated to the network elements in system 100.

Figure 2C:
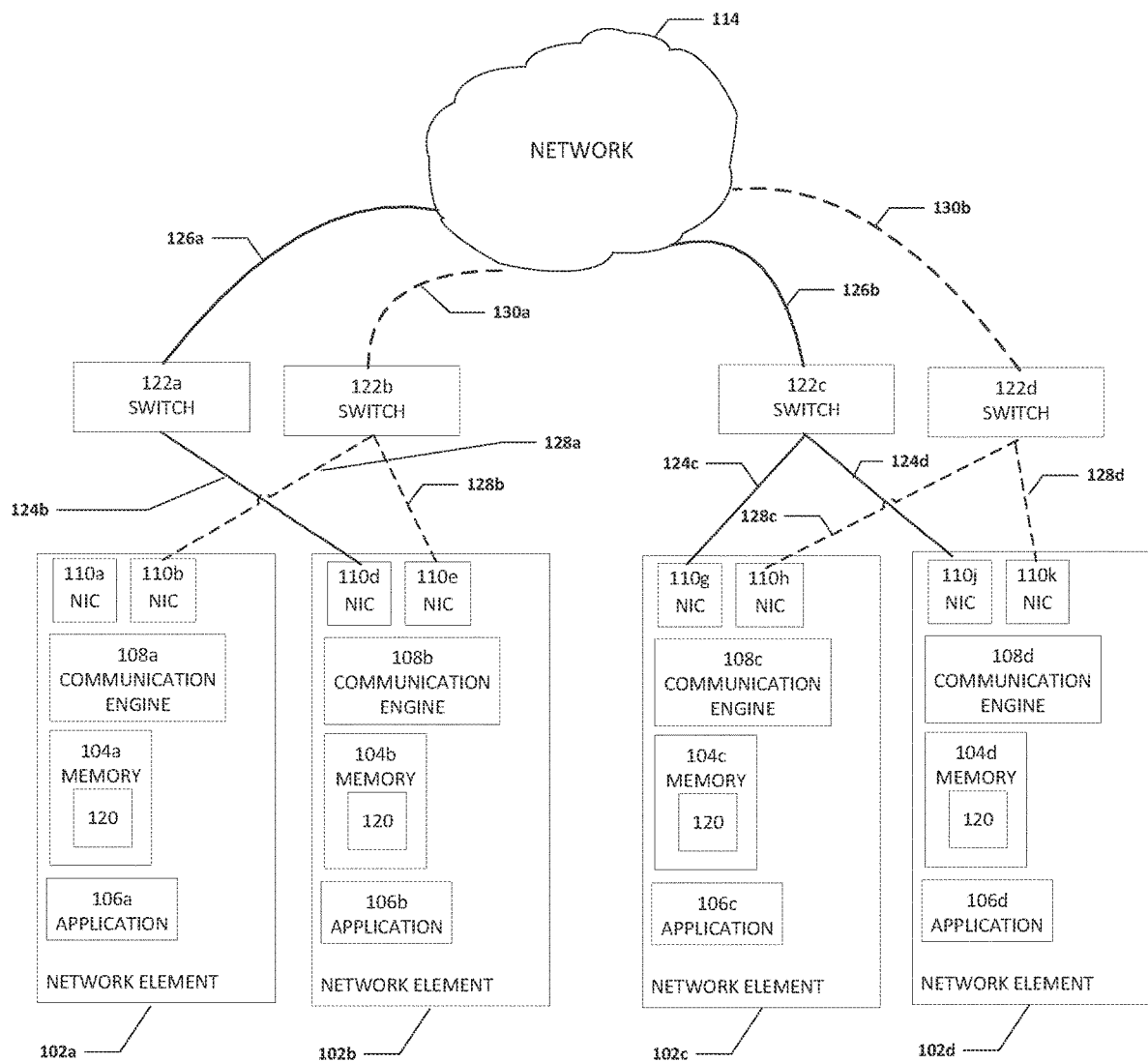

Turning to FIG. 2C, FIG. 2C is a simplified block diagram of an example of communications in system 100. As illustrated in FIG. 2C, first level subnet path 124a has been compromised and is preventing communication between NIC 110a and first level switch 122a. As a result, network element 102a and application 106a can no longer communicate with network element 102c and application 106c on the first subnet associated with first level subnet path 124a.

In an example, communication engine 108c can receive a failure notification from NIC 110g that communications with NIC 110a have failed. Communication engine 108c can analyze NIC table 120 and determine that NIC 110a is located on network element 102a and that local NIC 110h is in communication with NIC 110b which is also located on network element 102a. Communication engine 108c can send an out of band message to communication engine 108a using NIC 110h, first level subnet path 128c, first level switch 122d, second subnet path 130b, network 114, second subnet path 130a, first level switch 122b, first level subnet path 128a, and NIC 110b.

Communication engine 108a can receive the out of band message and disable NIC 110b. Also, communication engine 108a can resend any data that was not delivered or for which an acknowledgement was not received. In addition, communication engine 108a can change the entry for NIC 110b in NIC table 120 to indicate that NIC 110b is disabled. The updated NIC table 120 can be communicated to the network elements in system 100.

In another example, communication engine 108a can receive a failure notification from NIC 110b that communications with NIC 110g have failed. Communication engine 108a can analyze NIC table 120 and determine that NIC 110g is located on network element 102c and that local NIC 110b is in communication with NIC 110h which is also located on network element 102c. Communication engine 108a can send an out of band message to communication engine 108c using NIC 110b, first level subnet path 128a, first level switch 122b, second subnet path 130a, network 114, second subnet path 130b, first level switch 122d, first level subnet path 128c, and NIC 110h.

Communication engine 108c can receive the out of band message and disable NIC 110g. In addition, communication engine 108c can change the entry for NIC 110b in NIC table 120 to indicate that NIC 110b is disabled. The updated NIC table 120 can be communicated to the network elements in system 100.

Figure 3:
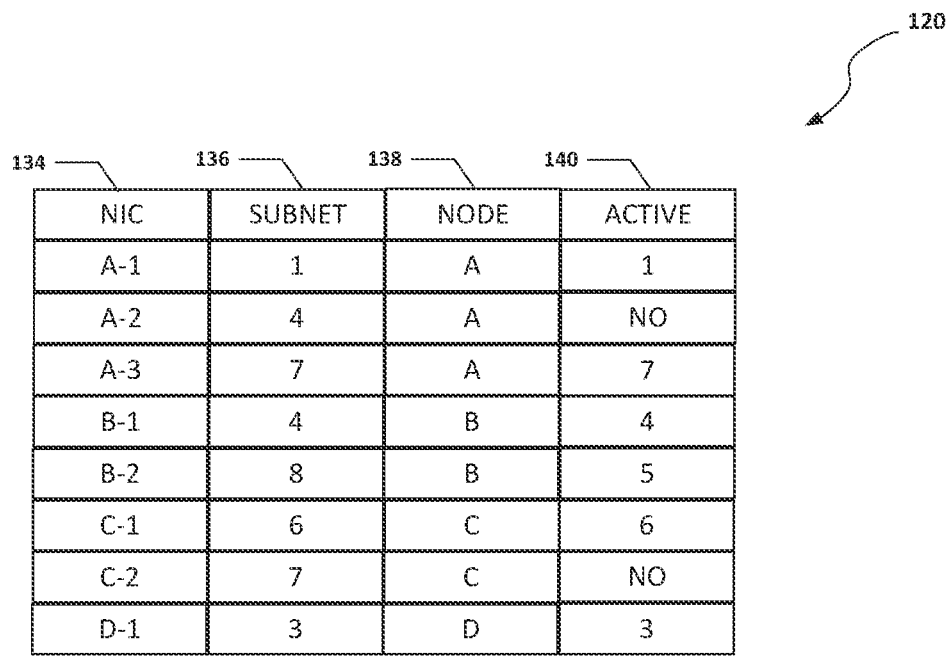
FIG. 3 is simplified block diagram of a NIC table illustrating examples details to enable the communication of a message using a NIC on a subnet, in accordance with an embodiment of the present disclosure.
Figure 4:
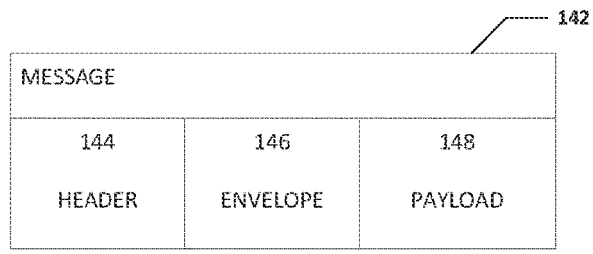
FIG. 4 is simplified block diagram of a packet illustrating examples details to enable the communication of a message using a NIC on a subnet, in accordance with an embodiment of the present disclosure.

Turning to FIG. 3, FIG. 3 is a simplified block diagram of an example of NIC table 120 for use in communications in system 100. As illustrated in FIG. 3, NIC table 120 can include a NIC column 134, a subnet column 136, a node column 138, and an active column 140. NIC column 134 can include an identifier of NICs in system 100. Subnet column 136 can indicate what subnet is associated with each NIC in NIC column 134. Node column 138 can indicate what node or network element is associated with each NIC in NIC column 134. Active column 140 can indicate if the NIC in NIC column 134 is active on the subnet associated with the NIC.

Figure 5:
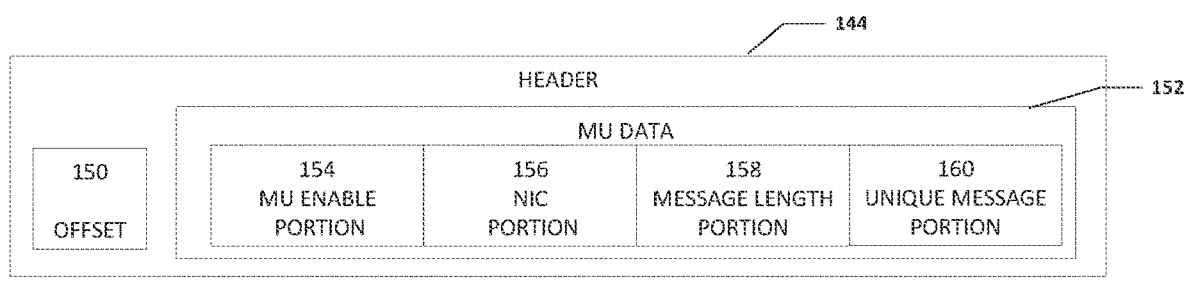
FIG. 5 is simplified block diagram of a portion of a packet illustrating examples details to enable the communication of a message using a NIC on a subnet, in accordance with an embodiment of the present disclosure.

Turning to FIG. 5, FIG. 5 is a simplified block diagram illustrating example details of a message 142 for use in system 100, in accordance with an embodiment of the present disclosure. Message 142 can be used in communications between network elements. For example, message 142 can be used for a PUT command, a GET command, when communicating a message that includes an amount of data that is less than an MTU, when communicating a message that includes an amount of data that is more than an MTU threshold, etc. Message 142 can include a header portion 144, an envelope portion 146, and a payload portion 148. Header portion 144 can include addressing and other data that is required for message 142 to reach its intended destination. Header portion 144 can also include offset data and MU related data. In an example, envelope portion 146 is part of header portion 144.

Envelope portion 146 can include data to help distinguish various messages and allow a network element to selectively receive message 142. Envelope portion 146 is typically implementation dependent and can include a message tag, communicator, source, destination, message length, tag match bits, message ID, and other implementation specific information. In an example, envelope portion 146 may include communicator data. The communicator data can include a handle to a group or ordered set of processes and can specify a communication context. Payload portion 148 can include the payload data of message 142. In an example, payload portion 148 can include a manifest.

Turning to FIG. 5, FIG. 5 is a simplified block diagram illustrating example details of header portion 144 for use in system 100, in accordance with an embodiment of the present disclosure. Header portion 144 can include an offset portion 150 and an MU data portion 152. MU data portion 152 can include an MU enabled portion 154, a NIC portion 156, a message length portion 158, and a unique message portion 160. Offset portion 150 includes the offset in the allocated memory region from which to start pulling data for the response to a GET command. In an example, MU data portion 152 may be a 64-bit field.

MU enabled portion 154 may be related to a MU parameter. For example, a value of zero in MU enabled portion 154 can indicate that the MU protocol is disabled or not chosen. A value of one in MU enabled portion 154 can indicate that, in the initiator to receiver direction, the MU is enabled. A value of two in MU enabled portion 154 can indicate that, in the receiver to initiator direction, the MU is enabled and may indicate a cleanup. A value of three in MU enabled portion 154 can be reserved. In a specific example, MU enabled portion 154 may be a two-bit integer.

NIC portion 156 can indicate NIC related data. For example, a zero value in NIC portion 156 can be undefined. A one value in NIC portion 156 can be initiator specific and specify how many NICs an indicator has available for the receiver to pull the chunks of the message. A two value in NIC portion 156 can be receiver specific and specify how many of the initiator side NICs the receiver will use to pull the chunks of the message. This can also be used to provide the indicator with a count of how many GET commands to expect from the receiver before cleaning up allocated regions of memory. A three value in NIC portion 156 can be reserved. In a specific example, NIC portion 156 may be a three-bit integer.

Message length portion 158 can indicate the size of the message length. For example, a zero value in message length portion 158 can be undefined. A one value in the message length portion 158 can indicate the length of the initiator's allocated regions of memory. A two value in message length portion 158 can indicate the possible length of the pull request across the NICs. A three value in message length portion 158 can be reserved. In a specific example, message length portion 158 may be a thirty-two bit integer.

In a PUT command, unique message portion 160 can indicate the tag matching or message ID for the communication related to message 142. In a responding GET command from the receiver, the message ID is used as the tag matching bits and is included in the envelope portion of the message. In an example, a zero value in unique message portion 160 can be undefined. A one value in unique message portion 160 can indicate that the initiator generated unique message ID for a given multi-unit transaction. A two value in unique message portion 160 can be used by the receiver to echo the message ID field from the initiator. A three value in the unique message portion 160 can be reserved. In a specific example, unique message portion 160 may be a twenty-eight bit integer.

Figure 6A:
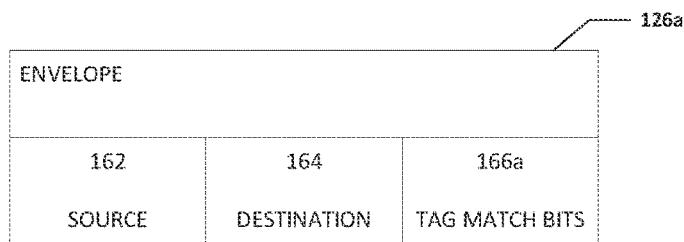
FIGS. 6A and 6B are simplified block diagrams of a portion of a packet illustrating examples details to enable the communication of a message using a NIC on a subnet, in accordance with an embodiment of the present disclosure.

Turning to FIG. 6A, FIG. 6A is a simplified block diagram illustrating example details of envelope portion 146a for use in system 100, in accordance with an embodiment of the present disclosure. Envelope portion 146a can include a source portion 162, a destination portion 164, and a tag match bits portion 166. Source portion 162 can help identify the source of message 142 and is implicitly determined by the identity of the source of message 142. The source of message 142 may be an initiator or a receiver (e.g., an initiator that is the source of a PUT command message or a receiver that is the source of a GET command message). Destination portion 164 can help identify the destination of message 142 and is specified by a dent argument in MPI. The destination may be an initiator or a receiver. Tag match bits portion 166 can help provide a mechanism for distinguishing between different messages. In MPI, a sending process must associate a tag with a message to help identify the message.

Figure 6B:
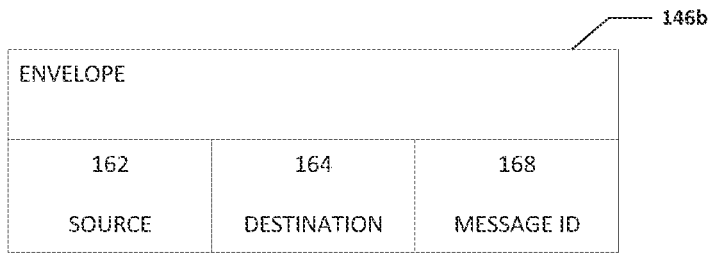

Turning to FIG. 6B, FIG. 6B is a simplified block diagram illustrating example details of envelope portion 146b for use in system 100, in accordance with an embodiment of the present disclosure. In an initial PUT command from the initiator, the tag matching bits are provided by the initiator (e.g., communication engine 108), and are matched against the tag match bits of receives at the receiver. When either rendezvous or MU are in use, the tag matching bits in the GET command(s) are set to the message ID. The receiver obtains the message ID from the header data of the original PUT from the initiator. Envelope portion 146b can include source portion 162, destination portion 164, and a message ID portion 168. Message ID portion 168 can include the message ID that will allow the initiator to identify the exposed region of memory on the initiator where the data for the message is located. In addition, the receiver can use the message ID (and the NIC where data was received) to determine the allocated memory region on the receiver that a chunk of data should be placed.

Figure 7:
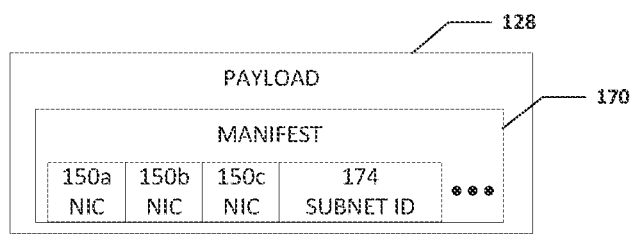
FIG. 7 is simplified block diagram of a portion of a packet illustrating examples details to enable the communication of a message using a NIC on a subnet, in accordance with an embodiment of the present disclosure.

Turning to FIG. 7, FIG. 7 is a simplified block diagram illustrating example details of payload portion 148 for use in system 100, in accordance with an embodiment of the present disclosure. Payload portion 148 can include a manifest 170. Manifest 170 can include NIC data 172a-172c and a subnet ID 174. NIC data 172a-172c can include an identification of each specific NIC on the initiator that a receiver can use to pull data from the initiator.

Subnet ID 174 identifies the subnet that includes the NIC that communicated the message. A subnet consists of a set of ports where each port has one or more NICs such that all NICs in a given subnet are unique. In clusters that consists of multiple planes (subnets), the fabric manager will configure each plane (subnet) with a separate subnet ID. This can also be applied to examples where each NIC has multiple ports and each port is assigned to a different subnet.

Figure 8:
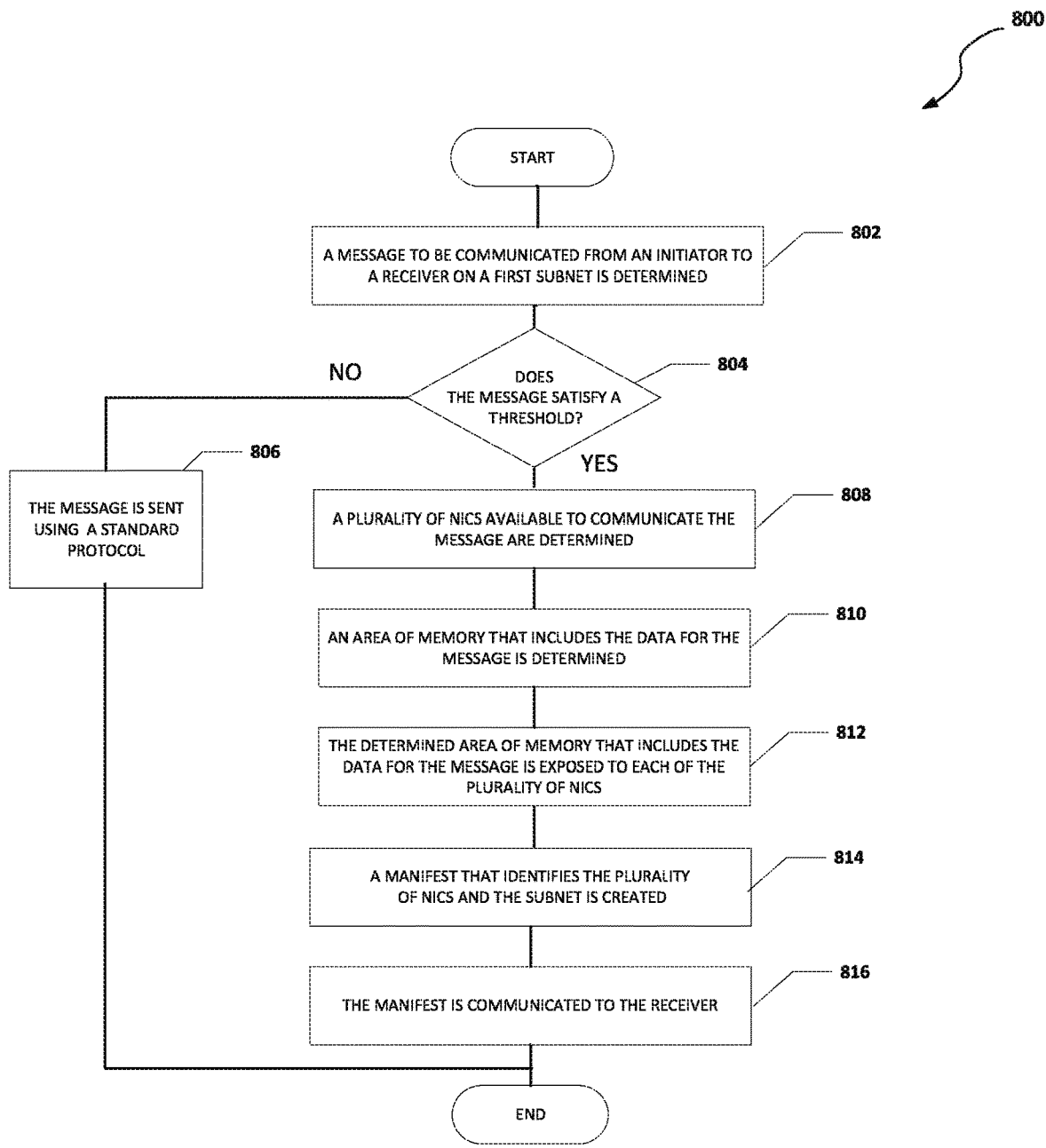
FIG. 8 is a simplified flowchart illustrating potential operations that may be associated with the system in accordance with an embodiment.

Turning to FIG. 8, FIG. 8 is an example flowchart illustrating possible operations of a flow 800 that may be associated with the communication of a message using a NIC on a subnet, in accordance with an embodiment. In an embodiment, one or more operations of flow 800 may be performed by communication engine 108. At 802, a message to be communicated from an initiator to a receiver on a first subnet is determined. At 804, the system determines if the message satisfies a threshold. For example, the threshold may be an MTU. If the message does not satisfy the threshold, then the message is sent using a standard protocol, as in 806. For example, if the message is small, the message can be sent using an MPI PUT command because the entire message fits in a single packet and is delivered to the receiver. If the message is large (e.g. larger than an MTU and MU is not enabled), then the message may be sent using a RTS/CTS mechanism.

If the message does satisfy the threshold, then a plurality of NICs available to communicate the message are determined, as in 808. At 810, an area of memory that includes the data for the message is determined. At 812, the determined area of memory that includes the data for the message is exposed to each of the plurality of NICs. At 814, a manifest that identifies the plurality of NICs and the subnet is created. At 816, the manifest is communicated to the receiver. In an example, a ME is posted on each of the determined plurality of NICs, where the ME points to the exposed area of memory that includes the data for the message. The ME is associated with a message ID and the message ID can be sent to the receiver in a PUT command. When an initiator receives a GET command at a NIC from a receiver, the GET command will include the message ID and the message ID can be used to determine the ME and the exposed area of memory that includes the data to be communicated to the receiver.

Figure 9:
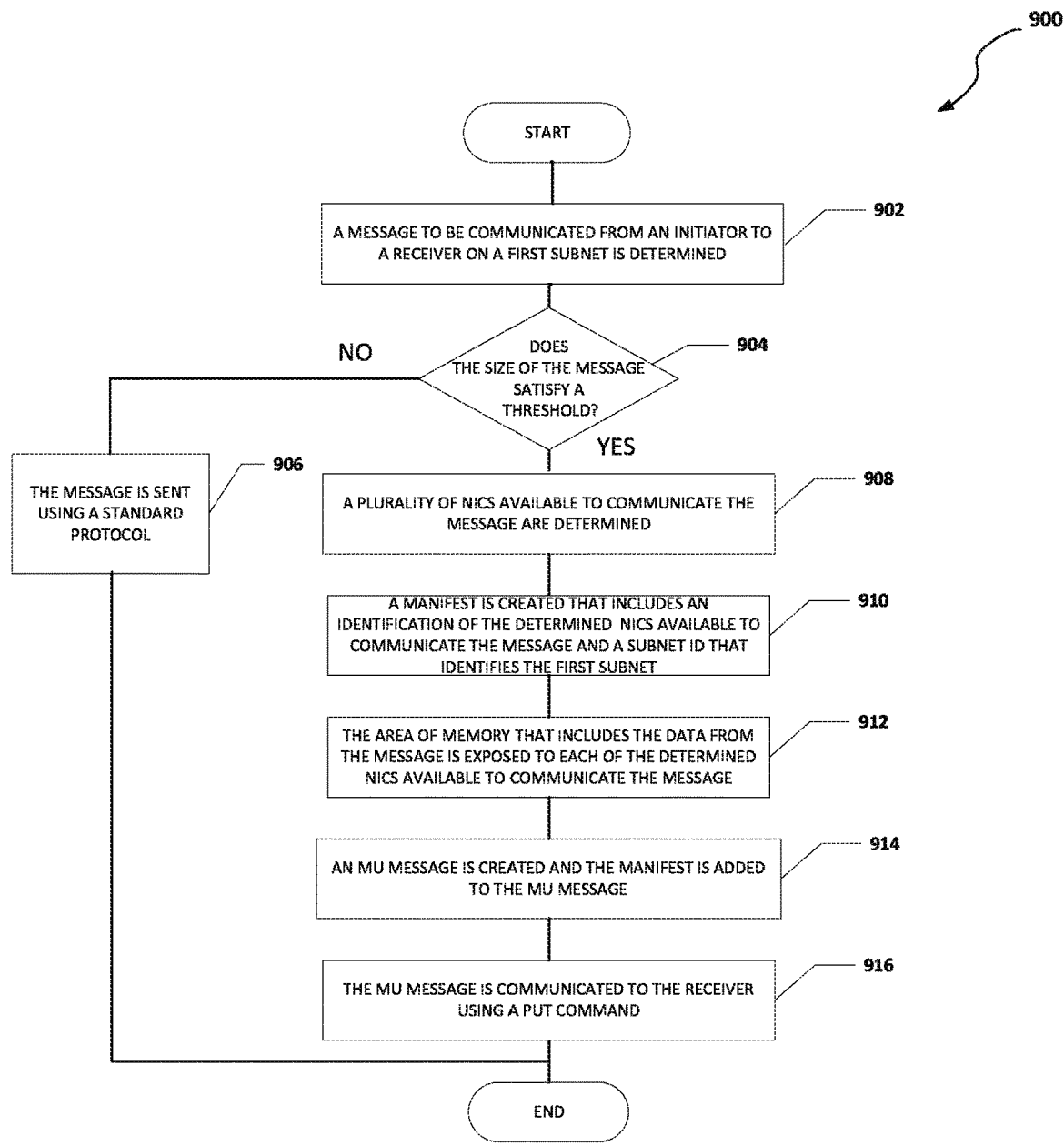
FIG. 9 is a simplified flowchart illustrating potential operations that may be associated with the system in accordance with an embodiment.

Turning to FIG. 9, FIG. 9 is an example flowchart illustrating possible operations of a flow 900 that may be associated with the communication of a message using a NIC on a subnet, in accordance with an embodiment. In an embodiment, one or more operations of flow 900 may be performed by communication engine 108. At 902, a message to be communicated from an initiator to a receiver on a first subnet is determined. At 904, the system determines if the size of the message satisfies a threshold. For example, the threshold may be an MTU threshold. If the size of message does not satisfy the threshold, then the message is sent using a standard protocol, as in 906. For example, if the message is small, the message can be sent using an MPI PUT command because the entire message fits in a single packet and is delivered to the receiver. If the message is large (e.g. larger than an MTU and MU is not enabled), then the message may be broken up into chunks and each chunk can be sent using a RTS/CTS mechanism to transfer each chunk.

If the size of the message does satisfy the threshold, then a plurality of NICs available to communicate the message are determined, as in 908. At 910, a manifest is created that includes an identification of the determined NICs available to communicate the message and a subnet ID that identifies the first subnet. At 912, the area of memory that includes the data for the message is exposed to each of the determined NICs available to communicate the message. At 914, an MU message is created and the manifest is added to the MU message. In an example, a message ID is also added to the MU message (e.g., the message ID is added to the envelope portion of an MU message). At 916, the MU message is communicated to the receiver using a PUT command.

Figure 10:
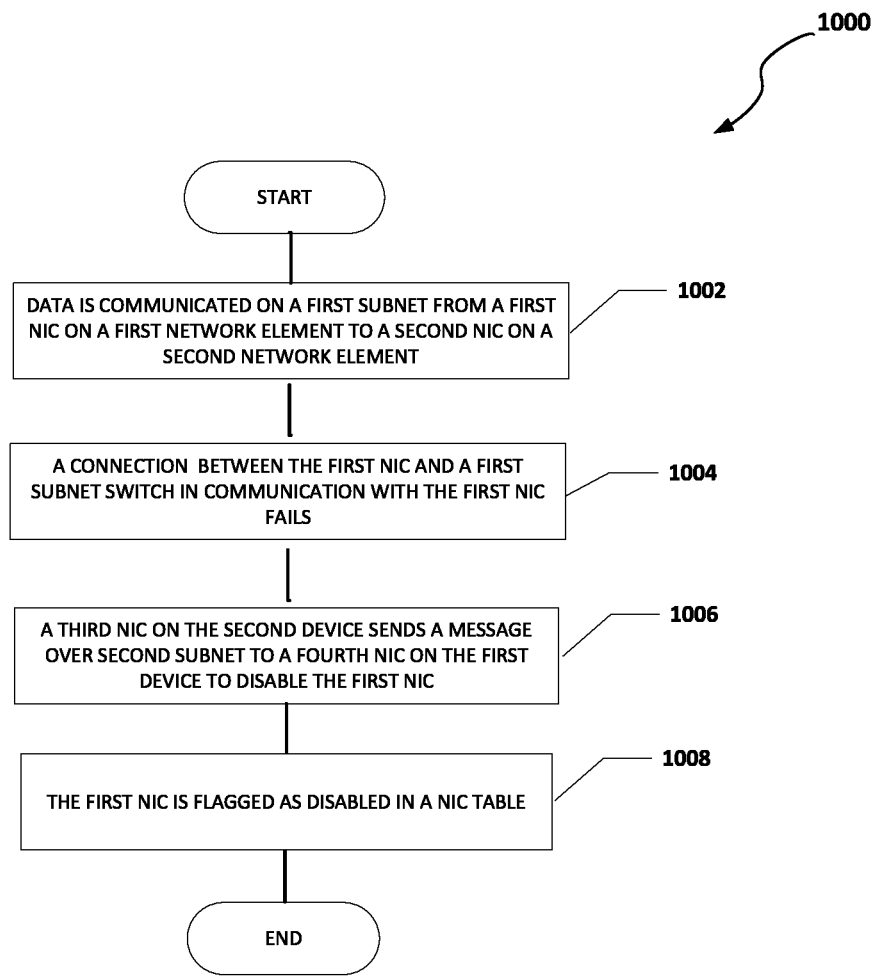
FIG. 10 is a simplified flowchart illustrating potential operations that may be associated with the system in accordance with an embodiment.

Turning to FIG. 10, FIG. 10 is an example flowchart illustrating possible operations of a flow 1000 that may be associated with the communication of a message using a NIC on a subnet, in accordance with an embodiment. In an embodiment, one or more operations of flow 1000 may be performed by communication engine 108. At 1002, data is communicated on a first subnet from a first NIC on a first network element to a second NIC on a second network element. At 1004, a connection between the first NIC and a first subnet switch in communication with the first NIC fails. At 1006, A third NIC on the second device sends a message over a second subnet to a fourth NIC on the first device to disable the first NIC. At 1008, the first NIC is flagged as disabled in a NIC table.

Figure 11:
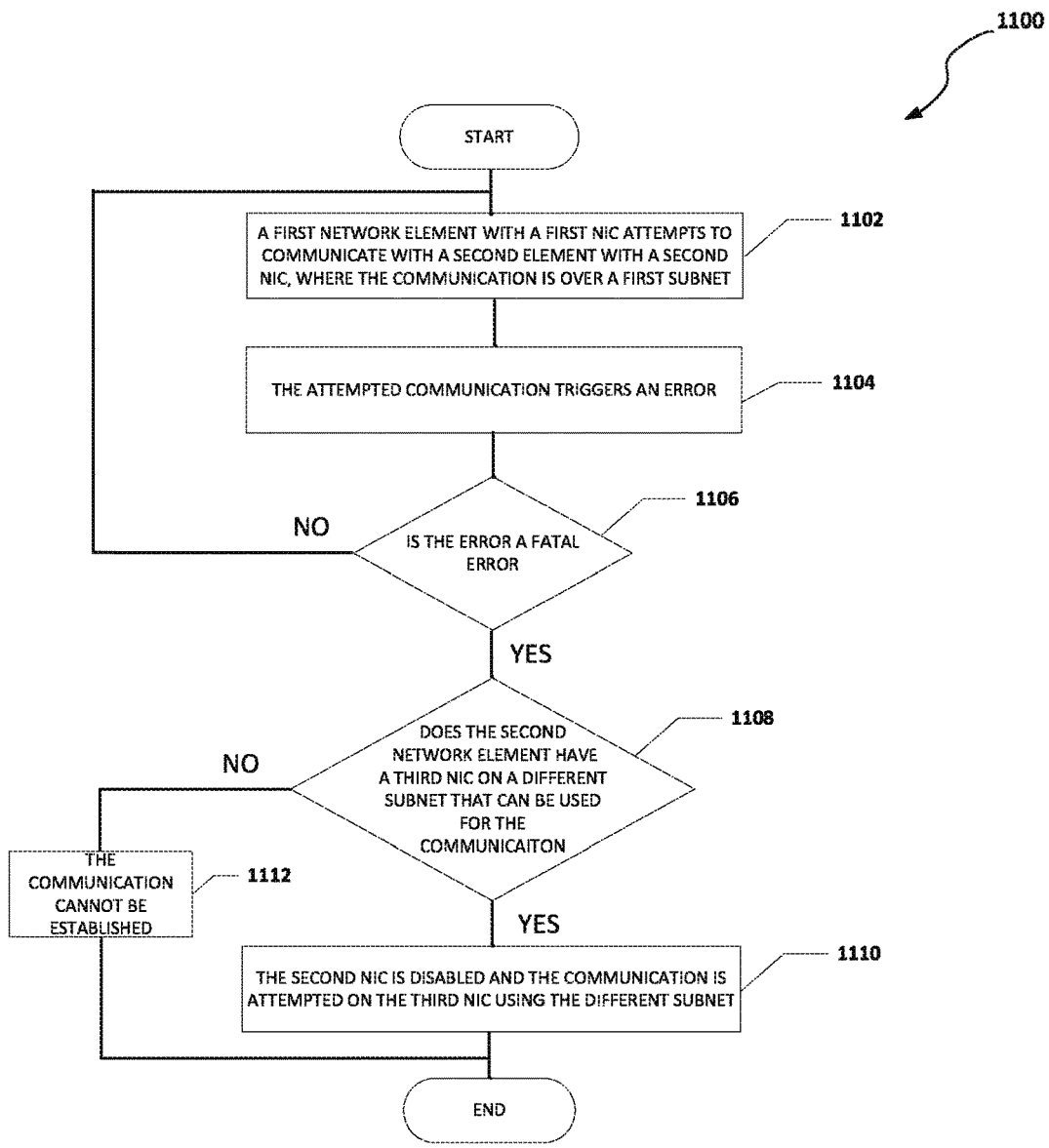
FIG. 11 is a simplified flowchart illustrating potential operations that may be associated with the system in accordance with an embodiment.

Turning to FIG. 11, FIG. 11 is an example flowchart illustrating possible operations of a flow 1100 that may be associated with the communication of a message using a NIC on a subnet, in accordance with an embodiment. In an embodiment, one or more operations of flow 1100 may be performed by communication engine 108. At 1102, a first network element with a first NIC attempts to communicate with a second element with a second NIC, where the communication is over a first subnet. At 1104, the attempted communication triggers an error. At 1106, the system determines if the error is a fatal error. If the error is not a fatal error, then the system returns to 1102 where the first first network element with the first NIC attempts to communicate with the second element with the second NIC, where the communication is over a first subnet If the error is a fatal error, then the system determines if the second network element has a third NIC on a different subnet that can be used for the communication, as in 1108. If the second network element has a third NIC on a different subnet that can be used for the communication, then the second NIC is disabled and the communication is attempted on the third NIC using the different subnet, as in 1110. In an example, the third NIC is marked as disabled in a NIC table. If the second network element does not have a third NIC on a different subnet that can be used for the communication, then the communication cannot be established, as in 1112.

It is also important to note that the operations in the preceding flow diagrams (i.e., FIGS. 8-11) illustrate only some of the possible correlating scenarios and patterns that may be executed by, or within, system 100. Some of these operations may be deleted or removed where appropriate, or these operations may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by system 100 in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. Moreover, certain components may be combined, separated, eliminated, or added based on particular needs and implementations. Additionally, although system 100 have been illustrated with reference to particular elements and operations that facilitate the communication process, these elements and operations may be replaced by any suitable architecture, protocols, and/or processes that achieve the intended functionality of system 100.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

OTHER NOTES AND EXAMPLES

Example C1 is at least one machine readable storage medium having one or more instructions that when executed by at least one processor, cause the at least one processor to determine a network interface controller (NIC) in a first subnet to be used to communicate a message to a receiver, wherein the NIC is configured to comply with a message passing interface protocol, create a manifest that includes an identifier of the NIC and a subnet ID that identifies the first subnet, and communicate the manifest to the receiver.

In Example C2, the subject matter of Example C1 can optionally include where the subject matter of any one of Examples C1-C3 can optionally include where the one or more instructions further cause the at least one processor to add the subnet ID to a NIC table, wherein the NIC table includes an identification of a plurality of NICs, a subnet associated with each of the plurality of NICs, and an identification of a specific network element that includes a specific NIC.

In Example C3, the subject matter of any one of Examples C1-C2 can optionally include where the NIC table also includes an indicator when the specific NIC is active.

In Example C4, the subject matter of any one of Examples C1-C3 can optionally include where the one or more instructions further cause the at least one processor to determine that the NIC in the first subnet to be used to communicate the message is a non-operating NIC and is not operational, determine the network element that includes the non-operating NIC, determine an alternate NIC on a different subnet but on the same network element that includes the non-operating NIC, and communicate with the alternate NIC using the different subnet.

In Example C5, the subject matter of any one of Examples C1-C4 can optionally include where the communication with the alternate NIC is a request to disable the non-operating NIC.

In Example C6, the subject matter of any one of Examples C1-C5 can optionally include where the communication with the alternate NIC is a request to disable the non-operating NIC and once the non-operating NIC is disabled, stale packets that arrive at the non-operating NIC are dropped.

In Example C7, the subject matter of any one of Examples C1-C6 can optionally include where the NIC implements a Portals protocol.

In Example A1, a system can include a first network element, memory, a communication engine, and at least one processor. The communication engine is configured to cause the at least one processor to determine a network interface controller (NIC) in a first subnet to be used to communicate a message to a receiver, wherein the NIC is configured to comply with a message passing interface protocol, create a manifest that includes an identifier of the NIC and a subnet ID that identifies the first subnet, and communicate the manifest to the receiver.

In Example, A2, the subject matter of Example A1 can optionally include where the communication engine is further configured to cause the at least one processor to add the subnet ID to a NIC table, wherein the NIC table includes an identification of a plurality of NICs, a subnet associated with each of the plurality of NICs, and an identification of a specific network element that includes a specific NIC.

In Example A3, the subject matter of any one of Examples A1-A2 can optionally include where the NIC table also includes an indicator when the specific NIC is active.

In Example A4, the subject matter of any one of Examples A1-A3 can optionally include where the communication engine is further configured to cause the at least one processor to determine that the NIC in the first subnet to be used to communicate the message is a non-operating NIC and is not operational, determine the network element that includes the non-operating NIC, determine an alternate NIC on a different subnet but on the same network element that includes the non-operating NIC, and communicate with the alternate NIC using the different subnet.

In Example A5, the subject matter of any one of Examples A1-A4 can optionally include where the communication with the alternate NIC is a request to disable the non-operating NIC.

Example M1 is a method including determining a network interface controller (NIC) in a first subnet to be used to communicate a message to a receiver, wherein the NIC is configured to comply with a message passing interface protocol, creating a manifest that includes an identifier of the NIC and a subnet ID that identifies the first subnet, and communicating the manifest to the receiver.

In Example M2, the subject matter of Example M1 can optionally include adding the subnet ID to a NIC table, wherein the NIC table includes an identification of a plurality of NICs, a subnet associated with each of the plurality of NICs, and an identification of a specific network element that includes a specific NIC.

In Example M3, the subject matter of any one of the Examples M1-M2 can optionally include where the NIC table also includes an indicator when the specific NIC is active on a specific subnet that is associated with the specific NIC.

In Example M4, the subject matter of any one of the Examples M1-M3 can optionally include determining that the NIC in the first subnet to be used to communicate the message is a non-operating NIC and is not operational, determining the network element that includes the non-operating NIC, determining an alternate NIC on a different subnet but on the same network element that includes the non-operating NIC, and communicating with the alternate NIC using the different subnet.

In Example M5, the subject matter of any one of the Examples M1-M4 can optionally include where the communication with the alternate NIC is a request to disable the non-operating NIC in the first subnet.

In Example M6, the subject matter of any one of Examples M1-M5 can optionally include where the message passing interface protocol is used to communicate the manifest to the receiver using an active NIC on a different subnet.

Example S1 is a system for communication of a message a network interface controller (NIC) on a subnet, the system can include memory, one or more processors, and a communication engine. The communication engine can be configured to determine a network interface controller (NIC) in a first subnet to be used to communicate a message to a receiver, wherein the NIC is configured to comply with a message passing interface protocol, create a manifest that includes an identifier of the NIC and a subnet ID that identifies the first subnet, and communicate the manifest to the receiver.

In Example S2, the subject matter of Example S1 can optionally include where the communication engine is further configured to add the subnet ID to a NIC table, wherein the NIC table includes an identification of a plurality of NICs, a subnet associated with each of the plurality of NICs, and an identification of a specific network element that includes a specific NIC.

In Example S3, the subject matter of any one of the Examples S1-S2 can optionally include where the NIC table also includes an indicator when the specific NIC is active.

In Example S4, the subject matter of any one of the Examples S1-S3 can optionally include where the communication engine is further configured to determine that the NIC in the first subnet to be used to communicate the message is a non-operating NIC and is not operational, determine the network element that includes the non-operating NIC, determine an alternate NIC on a different subnet but on the same network element that includes the non-operating NIC, and communicate with the alternate NIC using the different subnet.

In Example S5, the subject matter of any one of the Examples S1-S4 can optionally include where the communication with the alternate NIC is a request to disable the non-operating NIC.

In Example S6, the subject matter of any one of the Examples S1-S5 can optionally include where the NIC implements a Portals protocol.

In Example S7, the subject matter of any one of the Examples S1-S6 can optionally include where the message passing interface protocol is used to communicate the manifest to the receiver.

Example AA1 is an apparatus including means for determining a network interface controller (NIC) in a first subnet to be used to communicate a message to a receiver, wherein the NIC is configured to comply with a message passing interface protocol, means for creating a manifest that includes an identifier of the NIC and a subnet ID that identifies the first subnet, and means for communicating the manifest to the receiver.

In Example AA2, the subject matter of Example AA1 can optionally include means for adding the subnet ID to a NIC table, wherein the NIC table includes an identification of a plurality of NICs, a subnet associated with each of the plurality of NICs, and an identification of a specific network element that includes a specific NIC.

In Example AA3, the subject matter of any one of Examples AA1-AA2 can optionally include where the NIC table also includes an indicator when the specific NIC is active.

In Example AA4, the subject matter of any one of Examples AA1-AA3 can optionally include means for determining that the NIC in the first subnet to be used to communicate the message is a non-operating NIC and is not operational, means for determining the network element that includes the non-operating NIC, means for determining an alternate NIC on a different subnet but on the same network element that includes the non-operating NIC, and means for communicating with the alternate NIC using the different subnet.

In Example AA5, the subject matter of any one of Examples AA1-AA4 can optionally include where the communication with the alternate NIC is a request to disable the non-operating NIC.

In Example AA6, the subject matter of any one of Examples AA1-AA5 can optionally include where the communication with the alternate NIC is a request to disable the non-operating NIC and once the non-operating NIC is disabled, stale packets that arrive at the non-operating NIC are dropped.

In Example AA7, the subject matter of any one of Examples AA1-AA6 can optionally include where the NIC implements a Portals protocol.

Example X1 is a machine-readable storage medium including machine-readable instructions to implement a method or realize an apparatus as in any one of the Examples A1-A5, AA1-AA7, or M1-M6. Example Y1 is an apparatus comprising means for performing of any of the Example methods M1-M6. In Example Y2, the subject matter of Example Y1 can optionally include the means for performing the method comprising a processor and a memory. In Example Y3, the subject matter of Example Y2 can optionally include the memory comprising machine-readable instructions.

Example AB1 includes one or more tangible, nontransitory computer-readable storage media having stored thereon executable instructions to instruct a processor to: stripe an outgoing network message into two or more pieces; send a first piece to a receiver via a first network interface card (NIC), and a second piece to the receiver via a second NIC; and upon determining that the receiver failed to receive a piece of the outgoing network message, replay the piece that the receiver failed to receive via a third NIC.

Example AB2 includes the one or more tangible, non-transitory computer-readable media of example AB1, wherein the executable instructions are further to send a manifest to the receiver, wherein the manifest is to identify the outgoing network message, and include information to reconstruct the outgoing network message.

Example AB3 includes the one or more tangible, non-transitory computer-readable media of example AB1, wherein the first NIC is on a first data plane, the second NIC is on a second data plane, and the third NIC is on a third data plane.

Example AB4 includes the one or more tangible, nontransitory computer-readable media of example AB1, wherein the first NIC is on a first subnetwork, the second NIC is on a second subnetwork, and the third NIC is on a third subnetwork.

Example AB2 includes the one or more tangible, nontransitory computer-readable media of example AB5, wherein the first NIC, second NIC, and third NIC are peripheral component interconnect express (PCIe) devices.

Example AB6 includes the one or more tangible, nontransitory computer-readable media of example AB1, wherein the first NIC, second NIC, and third NIC comply with a message passing interface (MPI) protocol.

Example AB7 includes the one or more tangible, nontransitory computer-readable media of example AB1, wherein the first NIC, second NIC, and third NIC implement a Portals protocol.

Example AB8 includes the one or more tangible, nontransitory computer-readable media of example AB1, wherein the executable instructions are further to add respective subnet identifiers (IDs) for the first NIC, second NIC, and third NIC to a NIC table, wherein the NIC table includes an identification of a plurality of NICs, a subnet associated with each of the plurality of NICs, and an identification of a specific network element that includes a specific NIC.

Example AB9 includes the one or more tangible, nontransitory computer-readable media of example AB8, wherein the NIC table further includes an indicator for each NIC to indicate whether the NIC is active.

Example AB10 includes the one or more tangible, nontransitory computer-readable media of example AB9, wherein the executable instructions are to designate a NIC that sent the piece that the receiver failed to receive as inactive on the NIC table.

Example AB11 includes a computing apparatus, comprising: a processor circuit; a memory; a first network interface card (NIC), a second NIC, and a third NIC; and instructions encoded within the memory to instruct the processor circuit to: stripe an outgoing network message into two or more pieces; send a first piece to a receiver via the first NIC and a second piece to the receiver via the second NIC; and upon determining that the receiver failed to receive a piece of the outgoing network message, replay the piece that the receiver failed to receive via the third NIC.

Example AB12 includes the computing apparatus of example AB11, wherein the instructions are further to send a manifest to the receiver, wherein the manifest is to identify the outgoing network message, and include information to reconstruct the outgoing network message.

Example AB13 includes the computing apparatus of example AB11, wherein the first NIC is on a first data plane, the second NIC is on a second data plane, and the third NIC is on a third data plane.

Example AB14 includes the computing apparatus of example AB11, wherein the first NIC is on a first subnetwork, the second NIC is on a second subnetwork, and the third NIC is on a third subnetwork.

Example AB15 includes the computing apparatus of example AB11, wherein the first NIC, second NIC, and third NIC are peripheral component interconnect express (PCIe) devices.

Example AB16 includes the computing apparatus of example AB11, wherein the first NIC, second NIC, and third NIC comply with a message passing interface (MPI) protocol.

Example AB17 includes the computing apparatus of example AB11, wherein the first NIC, second NIC, and third NIC implement a Portals protocol.

Example AB18 includes the computing apparatus of example AB11, wherein the instructions are further to add respective subnet identifiers (IDs) for the first NIC, second NIC, and third NIC to a NIC table, wherein the NIC table includes an identification of a plurality of NICs, a subnet associated with each of the plurality of NICs, and an identification of a specific network element that includes a specific NIC.

Example AB19 includes the computing apparatus of example AB18, wherein the NIC table further includes an indicator for each NIC to indicate whether the NIC is active.

Example AB20 includes the computing apparatus of example AB19, wherein the instructions are to designate a NIC that sent the piece that the receiver failed to receive as inactive on the NIC table.

Example AB21 includes a computer-implemented method, comprising: striping an outgoing network message into two or more pieces; sending a first piece to a receiver via a first network interface card (NIC), and a second piece to the receiver via a second NIC; and upon determining that the receiver failed to receive a piece of the outgoing network message, replaying the piece that the receiver failed to receive via a third NIC.

Example AB22 includes the method of example AB21, further comprising sending a manifest to the receiver, wherein the manifest is to identify the outgoing network message, and include information to reconstruct the outgoing network message.

Example AB23 includes the method of example AB21, wherein the first NIC, second NIC, and third NIC comply with a message passing interface (MPI) protocol.

Example AB24 includes the method of example AB21, further comprising adding respective subnet identifiers (IDs) for the first NIC, second NIC, and third NIC to a NIC table, wherein the NIC table includes an identification of a plurality of NICs, a subnet associated with each of the plurality of NICs, and an identification of a specific network element that includes a specific NIC.

Example AB25 includes the method of example AB24, wherein the NIC table further includes an indicator for each NIC to indicate whether the NIC is active, and further comprising designating a NIC that sent the piece that the receiver failed to receive as inactive on the NIC table.

What is claimed is:

1. One or more tangible, nontransitory computer-readable storage media having stored thereon executable instructions to instruct a processor to:
   stripe an outgoing network message into two or more pieces;
   send to a receiver a manifest, comprising information to reconstruct the striped outgoing message and a list of network interface controllers (NICs) available to send the striped outgoing message;
   send a plurality of pieces of the striped outgoing message to the receiver via a plurality of NICs based on the manifest; and
   upon determining that the receiver failed to receive a piece of the striped outgoing network message sent via a first NIC, replay the piece that the receiver failed to receive via an available NIC based on the manifest, wherein the available NIC is different from the first NIC.

2. The one or more tangible, nontransitory computer-readable media of claim 1, wherein the first NIC is on a first data plane, a second NIC is on a second data plane.

3. The one or more tangible, nontransitory computer-readable media of claim 1, wherein the first NIC is on a first subnetwork, a second NIC is on a second subnetwork.

4. The one or more tangible, nontransitory computer-readable media of claim 1, wherein the first NIC and a second NIC are peripheral component interconnect express (PCIe) devices.

5. The one or more tangible, nontransitory computer-readable media of claim 1, wherein the first NIC and a second NIC comply with a message passing interface (MPI) protocol.

6. The one or more tangible, nontransitory computer-readable media of claim 1, wherein the first NIC and a second NIC implement a Portals protocol.

7. The one or more tangible, nontransitory computer-readable media of claim 1, wherein the executable instructions are further to add respective subnet identifiers (IDs) for the first NIC and a second NIC to a NIC table, wherein the NIC table includes an identification of a plurality of NICs, a subnet associated with each of the plurality of NICs, and an identification of a specific network element that includes a specific NIC.

8. The one or more tangible, nontransitory computer-readable media of claim 7, wherein the NIC table further includes an indicator for each NIC to indicate whether the NIC is active.

9. The one or more tangible, nontransitory computer-readable media of claim 8, wherein the executable instructions are to designate a NIC that sent the piece that the receiver failed to receive as inactive on the NIC table.

10. A computing apparatus, comprising:
a processor circuit; a memory;
a first network interface controller (NIC), and a second NIC; and
instructions encoded within the memory to instruct the processor circuit to:
stripe an outgoing network message into two or more pieces;
send to a receiver a manifest, comprising information to reconstruct the striped outgoing message and a list of NICs available to send the striped outgoing message;
send a plurality of pieces of the striped outgoing message to the receiver via a plurality of NICs based on the manifest; and
upon determining that the receiver failed to receive a piece of the striped outgoing network message sent via a first NIC, replay the piece that the receiver failed to receive via an available NIC based on the manifest, wherein the available NIC is different from the first NIC.

11. The computing apparatus of claim 10, wherein the first NIC is on a first data plane, and the second NIC is on a second data plane.

12. The computing apparatus of claim 10, wherein the first NIC is on a first subnetwork, and the second NIC is on a second subnetwork.

13. The computing apparatus of claim 10, wherein the first NIC and the second NIC are peripheral component interconnect express (PCIe) devices.

14. The computing apparatus of claim 10, wherein the first NIC and the second NIC comply with a message passing interface (MPI) protocol.

15. The computing apparatus of claim 10, wherein the first NIC and the second NIC implement a Portals protocol.

16. The computing apparatus of claim 10, wherein the instructions are further to add respective subnet identifiers (IDs) for the first NIC and the second NIC to a NIC table, wherein the NIC table includes an identification of a plurality of NICs, a subnet associated with each of the plurality of NICs, and an identification of a specific network element that includes a specific NIC.

17. The computing apparatus of claim 16, wherein the NIC table further includes an indicator for each NIC to indicate whether the NIC is active.

18. The computing apparatus of claim 17, wherein the instructions are to designate a NIC that sent the piece that the receiver failed to receive as inactive on the NIC table.

19. A computer-implemented method, comprising:
striping an outgoing network message into two or more pieces;
send to a receiver a manifest, comprising information to reconstruct the striped outgoing message and a list of network interface controllers (NICs) available to send the striped outgoing message;
send a plurality of pieces of the striped outgoing message to the receiver via a plurality of NICs based on the manifest; and
upon determining that the receiver failed to receive a piece of the striped outgoing network message sent via a first NIC, replaying the piece that the receiver failed to receive via an available NIC based on the manifest, wherein the available NIC is different from the first NIC.

20. The method of claim 19, wherein the first NIC and a second NIC comply with a message passing interface (MPI) protocol.

21. The method of claim 19, further comprising adding respective subnet identifiers (IDs) for the first NIC and a second NIC to a NIC table, wherein the NIC table includes an identification of a plurality of NICs, a subnet associated with each of the plurality of NICs, and an identification of a specific network element that includes a specific NIC.

22. The method of claim 21, wherein the NIC table further includes an indicator for each NIC to indicate whether the NIC is active, and further comprising designating a NIC that sent the piece that the receiver failed to receive as inactive on the NIC table.

23. The method of claim 19, further comprising designating a NIC that sent the piece that the receiver failed to receive as inactive on the NIC table.

24. The method of claim 19, wherein the first NIC and a second NIC are peripheral component interconnect express (PCIe) devices.

25. The method of claim 19, wherein the first NIC and a second NIC implement a Portals protocol.

\* \* \* \* \*

UNITED STATES PATENT AND TRADEMARK OFFICE
CERTIFICATE OF CORRECTION

PATENT NO. : 11,799,738 B2
APPLICATION NO. : 17/571420
DATED : October 24, 2023
INVENTOR(S) : Ravindra Babu Ganapathi et al.

It is certified that error appears in the above-identified patent and that said Letters Patent is hereby corrected as shown below:

On the Title Page

1. On Page 2, in Item (56), under "OTHER PUBLICATIONS", in Column 2, Line 2, delete "Councile" and insert -- Council --, therefor.

2. On Page 2, in Item (56), under "OTHER PUBLICATIONS", in Column 2, Line 24, delete "IEE" and insert -- IEEE --, therefor.

3. On Page 2, in Item (56), under "OTHER PUBLICATIONS", in Column 2, Line 26, delete "Passign" and insert -- Passing --, therefor.

Signed and Sealed this
Thirteenth Day of February, 2024

Katherine Kelly Vidal
*Director of the United States Patent and Trademark Office*